(12) United States Patent
Zhao et al.

(10) Patent No.: US 12,481,390 B2
(45) Date of Patent: Nov. 25, 2025

(54) TOUCH DISPLAY STRUCTURE AND DISPLAY APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Erjin Zhao, Beijing (CN); Jun Yan, Beijing (CN); Zhiliang Jiang, Beijing (CN); Ming Hu, Beijing (CN)

(73) Assignees: Chengdu BOE Optoelectronics Technology Co., Ltd., Sichuan (CN); Beijing BOE Technology Development Co., Ltd., Beijing (CN)

(*) Notice: Subject to any disclaimer, the term of this patent is extended or adjusted under 35 U.S.C. 154(b) by 0 days.

(21) Appl. No.: 18/293,811

(22) PCT Filed: May 16, 2023

(86) PCT No.: PCT/CN2023/094412
§ 371 (c)(1),
(2) Date: Jan. 31, 2024

(87) PCT Pub. No.: WO2023/246378
PCT Pub. Date: Dec. 28, 2023

(65) Prior Publication Data
US 2025/0123702 A1    Apr. 17, 2025

(30) Foreign Application Priority Data
Jun. 24, 2022    (CN) .......................... 202210730327.9

(51) Int. Cl.
*G06F 3/041* (2006.01)
*G06F 3/044* (2006.01)

(52) U.S. Cl.
CPC ........ *G06F 3/04164* (2019.05); *G06F 3/0446* (2019.05); *G06F 2203/04102* (2013.01)

(58) Field of Classification Search
CPC ............... G06F 3/04164; G06F 3/0446; G06F 2203/04102
See application file for complete search history.

(56) References Cited

U.S. PATENT DOCUMENTS 10,866,664 B2 * 12/2020 Miyamoto ............ G06F 3/0443
11,023,058 B2 *  6/2021 Park ...................... G06F 3/0412
(Continued)

FOREIGN PATENT DOCUMENTS

CN    107831957 A    3/2018
CN    207216591 U    4/2018
(Continued)

*Primary Examiner* — Amy Onyekaba
(74) *Attorney, Agent, or Firm* — The Webb Law Firm

(57) ABSTRACT

A touch display structure includes a light-emitting substrate and a touch structure. The touch structure includes first touch channels and second touch channels. At least one first touch channel includes adjacent first sub-touch channels, and a first sub-touch channel includes first touch electrodes; and in the same first touch channel, two adjacent first sub-touch channels are electrically connected; and/or at least one second touch channel includes adjacent second sub-touch channels, and a second sub-touch channel includes second touch electrodes; and in the same second touch channel, two adjacent second sub-touch channels are electrically connected. The touch structure includes crossing metal lines to form metal grid squares which form first touch electrodes and second touch electrodes in the touch structure. The light-emitting substrate includes sub-pixels. Orthographic projections of light-emitting regions of at least two sub-pixels are within a range of an orthographic projection of the same metal grid square.

20 Claims, 27 Drawing Sheets

(56) References Cited

U.S. PATENT DOCUMENTS

| | | | | |
|---|---|---|---|---|
| 11,093,092 | B2* | 8/2021 | Zeng | G06F 3/0412 |
| 12,197,666 | B2* | 1/2025 | Zeng | G06F 3/0446 |
| 12,197,683 | B2* | 1/2025 | Zhang | G06F 3/0443 |
| 2015/0160764 | A1* | 6/2015 | Bae | G06F 3/0445 |
| | | | | 345/174 |
| 2018/0253175 | A1* | 9/2018 | Yao | G06F 3/0445 |
| 2019/0146605 | A1* | 5/2019 | Xu | G06F 3/0446 |
| | | | | 345/174 |
| 2019/0204964 | A1* | 7/2019 | Wang | G06F 3/0446 |
| 2019/0235702 | A1* | 8/2019 | Wang | G06F 3/0443 |
| 2020/0034600 | A1* | 1/2020 | Chan | H10K 50/81 |
| 2020/0183538 | A1* | 6/2020 | Li | G06F 3/0448 |
| 2020/0411608 | A1* | 12/2020 | Tang | H10K 59/353 |
| 2022/0069027 | A1* | 3/2022 | Wang | H10K 59/352 |
| 2022/0100304 | A1* | 3/2022 | Yu | H10K 59/124 |
| 2022/0113854 | A1* | 4/2022 | He | G06F 3/0443 |
| 2022/0187951 | A1* | 6/2022 | Chen | G06F 21/32 |
| 2022/0197418 | A1* | 6/2022 | Liu | G06F 3/0412 |
| 2022/0197419 | A1* | 6/2022 | Sun | G06F 3/0412 |
| 2022/0197438 | A1* | 6/2022 | Sun | G06F 3/0443 |

FOREIGN PATENT DOCUMENTS

| | | | |
|---|---|---|---|
| CN | 108762542 A | 11/2018 | |
| CN | 218383922 U | 1/2023 | |

\* cited by examiner

TOUCH DISPLAY STRUCTURE AND DISPLAY APPARATUS

CROSS-REFERENCE TO RELATED APPLICATIONS

This application is the United States national phase of International Patent Application No. PCT/CN2023/094412 filed May 16, 2023, and claims priority to Chinese Patent Application No. 202210730327.9, filed Jun. 24, 2022, the disclosures of which are hereby incorporated by reference in their entireties.

BACKGROUND OF THE INVENTION

Field of the Invention

The present disclosure relates to the field of display technologies, and in particular, to a touch display structure and a display apparatus.

Description of Related Art

With the continuous development of electronic products, display apparatus having touch function and display function can realize easy and flexible human-computer interaction, and thus are widely used.

Active-matrix organic light-emitting diode (AMOLED) display apparatus can realize full-screen, narrow bezel, high resolution, rolling-wearable, foldable, etc., and have become an important development direction in the field of display technologies.

SUMMARY OF THE INVENTION

In an aspect, a touch display structure is provided, which includes a light-emitting substrate and a touch structure provided on at least one side of the light-emitting substrate.

The touch structure includes a plurality of first touch channels extending along a first direction, and a plurality of second touch channels extending along a second direction, and the first direction and the second direction cross each other; and the plurality of first touch channels and the plurality of second touch channels are insulated from each other.

At least one first touch channel includes multiple adjacent first sub-touch channels, and a first sub-touch channel includes multiple first touch electrodes arranged along the first direction and electrically connected in sequence; and in a same first touch channel, two adjacent first sub-touch channels are electrically connected; and/or at least one second touch channel includes multiple adjacent second sub-touch channels, and a second sub-touch channel includes multiple second touch electrodes arranged along the second direction and electrically connected in sequence; and in a same second touch channel, two adjacent second sub-touch channels are electrically connected.

The touch structure includes a plurality of metal lines, the plurality of metal lines cross each other to form a plurality of metal grid squares, and the plurality of metal grid squares form first touch electrodes and second touch electrodes in the touch structure.

The light-emitting substrate includes a plurality of sub-pixels, and each sub-pixel includes a light-emitting region; and orthographic projections of light-emitting regions of at least two sub-pixels on a reference surface are located within a range of an orthographic projection of a same metal grid square on the reference surface, and the reference surface is a plane where the light-emitting substrate is located.

In some embodiments, along the second direction, for the two adjacent first sub-touch channels in the same first touch channel, first touch electrodes in one first sub-touch channel are provided in one-to-one correspondence with first touch electrodes in the other first sub-touch channel; and at least one pair of correspondingly arranged first touch electrodes are electrically connected.

In some embodiments, the first touch channel further includes at least one first connection portion, the at least one pair of correspondingly arranged first touch electrodes are electrically connected through a first connection portion, and the first connection portion as a whole extends along the second direction.

In some embodiments, along the first direction, for the two adjacent second sub-touch channels in the same second touch channel, second touch electrodes in one second sub-touch channel are provided in one-to-one correspondence with second touch electrodes in the other second sub-touch channel; and at least one pair of correspondingly arranged second touch electrodes are electrically connected.

In some embodiments, the second touch channel further includes at least one second connection portion, the at least one pair of correspondingly arranged second touch electrodes are electrically connected through a second connection portion, and the second connection portion as a whole extends along the first direction.

In some embodiments, along the second direction, for the two adjacent first sub-touch channels in the same first touch channel, first touch electrodes in one first sub-touch channel are provided in one-to-one correspondence with first touch electrodes in the other first sub-touch channel; and at least one pair of correspondingly arranged first touch electrodes are electrically connected. Along the first direction, for the two adjacent second sub-touch channels in the same second touch channel, second touch electrodes in one second sub-touch channel are provided in one-to-one correspondence with second touch electrodes in the other second sub-touch channel; and at least one pair of correspondingly arranged second touch electrodes are electrically connected. The first touch channel further includes multiple first connection portions, the at least one pair of correspondingly arranged first touch electrodes are electrically connected through a first connection portion, and the first connection portion as a whole extends along the second direction. The second touch channel further includes multiple second connection portions, the at least one pair of correspondingly arranged second touch electrodes are electrically connected through a second connection portion, and the second connection portion as a whole extends along the first direction. At least one first connection portion crosses at least one second connection portion.

In some embodiments, the touch display structure includes a first conductive layer, an insulating layer and a second conductive layer that are stacked; and the insulating layer is located between the first conductive layer and the second conductive layer, and is provided therein with via holes. The first touch electrodes and the second touch electrodes are located in the first conductive layer.

The first connection portions are located in the first conductive layer, the second connection portions are located in the second conductive layer, and a second connection portion is electrically connected to corresponding second touch electrodes through via holes; alternatively, the second connection portions are located in the first conductive layer, the first connection portions are located in the second conductive layer, and a first connection portion is electrically connected to corresponding first touch electrodes through via holes.

In some embodiments, the first touch channel further includes third connection portions; and along the first direction, any two adjacent first touch electrodes are electrically connected through a third connection portion; and the second touch channel further includes fourth connection portions; and along the second direction, any two adjacent second touch electrodes are electrically connected through a fourth connection portion.

In some embodiments, the first touch electrodes and the second touch electrodes are all substantially rhombus-shaped electrodes. The first touch channel is located in a first rectangular region extending along the first direction, the second touch channel is located in a second rectangular region extending along the second direction, and a rectangular region in which the first rectangular region and the second rectangular region cross each other is a touch unit region.

The third connection portion and the fourth connection portion cross each other to form a first connection structure; and the touch unit region is provided therein with at least two first connection structures.

In some embodiments, the first touch channel includes first connection portions, and the second touch channel includes second connection portions; and a first connection portion and a second connection portion cross to form a second connection structure. The touch unit region is further provided therein with at least one second connection structure.

In some embodiments, at least one of the first touch electrodes is located in the touch unit region, and/or at least one of the second touch electrodes is located in the touch unit region.

In some embodiments, in the touch unit region, there are two first touch electrodes located in a same first sub-touch channel and provided adjacent to each other, and two second touch electrodes located in a same second sub-touch channel and provided adjacent to each other. Of the two first touch electrodes, each first touch electrode is provided adjacent to both the two second touch electrodes.

In some embodiments, the first touch electrodes, the second touch electrodes, the third connection portions and the fourth connection portions each are formed by multiple metal grid squares.

The first touch channel includes a first connection portion, and/or the second touch channel includes a second connection portion, the first connection portion and/or the second connection portion is formed by another multiple metal grid squares.

In some embodiments, the light-emitting substrate includes a plurality of pixel units, and each pixel unit includes multiple sub-pixels capable of emitting light of different colors. Orthographic projections of light-emitting regions of the multiple sub-pixels of the pixel unit on the reference surface are located within a range of an orthographic projection of at least one metal grid square on the reference surface; and of the multiple sub-pixels of the pixel unit, orthographic projections of light-emitting regions of at least two sub-pixels on the reference surface are located within a range of an orthographic projection of a same metal grid square on the reference surface.

In some embodiments, the pixel unit includes one sub-pixel capable of emitting red light, one sub-pixel capable of emitting blue light and two sub-pixels capable of emitting green light. The orthographic projections of the light-emitting regions of all sub-pixels of the pixel unit on the reference surface are located within the range of the orthographic projection of the same metal grid square on the reference surface.

In some embodiments, the multiple sub-pixels adopt a GGRB arrangement.

In some embodiments, the pixel unit includes one sub-pixel capable of emitting red light, one sub-pixel capable of emitting blue light and one sub-pixel capable of emitting green light.

The orthographic projections of the light-emitting regions of all sub-pixels of the pixel unit on the reference surface are located within the range of the orthographic projection of the same metal grid square on the reference surface; alternatively, in the pixel unit, an orthographic projection of a light-emitting region of the sub-pixel capable of emitting blue light and an orthographic projection of a light-emitting region of the sub-pixel capable of emitting green light on the reference surface are both located within the range of the orthographic projection of the same metal grid square on the reference surface, and an orthographic projection of a light-emitting region of the sub-pixel capable of emitting red light on the reference surface is located within a range of an orthographic projection of another metal grid square on the reference surface.

In some embodiments, the multiple sub-pixels adopt a Real RGB arrangement.

In some embodiments, the plurality of metal grid squares include a plurality of first sub-grid square groups and a plurality of second sub-grid square groups, the first sub-grid square groups and the second sub-grid square groups are alternately arranged; and a first sub-grid square group includes at least one first sub-grid square, and a second sub-grid square includes at least one second sub-grid square.

The light-emitting substrate includes a plurality of pixel units, and each pixel unit includes multiple sub-pixels capable of emitting light of different colors. Orthographic projections of light-emitting region of some of multiple sub-pixels of a pixel unit on the reference surface are located within a range of an orthographic projection of a same first sub-grid square on the reference surface; and orthographic projections of light-emitting regions of all sub-pixels of another pixel unit on the reference surface are located within a range of an orthographic projection of a same second sub-grid square on the reference surface.

In some embodiments, the metal lines extend in a straight line, and the metal grid squares formed by the plurality of metal lines crossing each other each are in a shape of a rectangle; alternatively, the metal lines extend in a folded line, and the metal grid squares formed by the plurality of metal lines crossing each other each are in a shape of a polygon; alternatively, a portion of the metal lines extends in a straight line, another portion of the metal lines extends in a folded line, and the metal grid squares formed by the plurality of metal lines crossing each other are in shapes of rectangles and polygons.

In some embodiments, light-emitting regions of at least one pair of adjacent sub-pixels are correspondingly provided therebetween with multiple metal lines, and the multiple metal lines are electrically connected to each other.

In some embodiments, the light-emitting substrate further includes a plurality of first signal lines extending along the first direction, and an orthographic projection of a metal line on the reference surface at least partially overlaps with an orthographic projection of at least one first signal line on the reference surface; and/or the light-emitting substrate further includes a plurality of second signal lines extending along the second direction, and an orthographic projection of a metal line on the reference surface at least partially overlaps with an orthographic projection of at least one second signal line on the reference surface.

In some embodiments, the first signal lines include at least one type of enable signal lines, scanning signal lines or initialization signal lines; and the second signal lines include at least one type of data lines or power supply lines. The power supply lines may be power supply signal lines.

In another aspect, a display apparatus is provided, which includes the touch display structure according to any one of the above embodiments.

BRIEF DESCRIPTION OF THE DRAWINGS

In order to describe technical solutions in the present disclosure more clearly, the accompanying drawings to be used in some embodiments of the present disclosure will be introduced briefly; obviously, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

DESCRIPTION OF THE INVENTION

Figure 1:
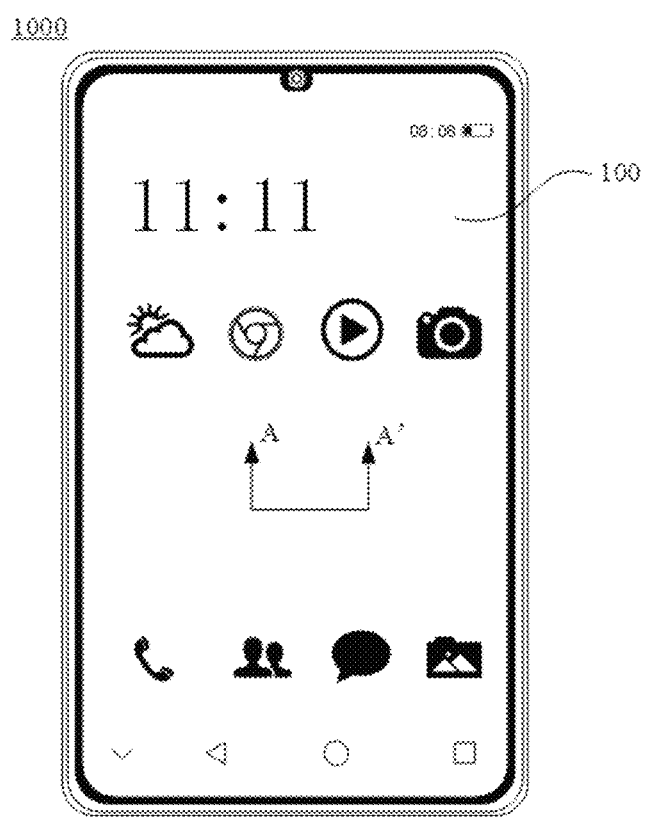
FIG. 1 is a top view of a display apparatus, in accordance with some embodiments.

The technical solutions in embodiments of the present disclosure will be described clearly and completely with reference to the accompanying drawings. Obviously, the described embodiments are merely some but not all of embodiments of the present disclosure. All other embodiments obtained on the basis of the embodiments of the present disclosure by a person of ordinary skill in the art shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to". In the description of the specification, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, specific features, structures, materials, or characteristics described herein may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, the features defined with "first" and "second" may explicitly or implicitly include one or more of the features. In the description of the embodiments of the present disclosure, the term "a plurality of/the plurality of" means two or more unless otherwise specified.

In the description of some embodiments, the expressions "electrically connected" and "connected" and derivatives thereof may be used. For example, the term "electrically connected" may be used in the description of some embodiments to indicate that two or more components are in direct physical contact or electrical contact with each other. The embodiments disclosed herein are not necessarily limited to the content herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The term such as "about", "substantially" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

In the description of the present disclosure, it will be understood that, orientations or positional relationships indicated by the terms such as "center", "longitudinal", "transverse", "length", "width", "vertical", "horizontal", "inner", "outer" are based on orientations or positional relationships shown in the drawings, which is merely for convenience in description of the present disclosure and simplifying the description, but not to indicate or imply that the indicated apparatus or element must have a specific orientation, or be constructed and operated in a specific orientation.

It will be understood that, in a case that a layer or element is referred to be on another layer or substrate, it may be that the layer or element is directly on the another layer or substrate, or it may be that there is an intermediate layer between the layer or element and the another layer or substrate.

Exemplary embodiments are described herein with reference to sectional views and/or plan views as idealized exemplary drawings. In the drawings, thicknesses of layers and sizes of regions are enlarged for clarity. Variations in shapes relative to the accompanying drawings due to, for example, manufacturing technologies and/or tolerances may be envisaged. Therefore, the exemplary embodiments should not be construed to be limited to the shapes of regions shown herein, but to include deviations in the shapes due to, for example, manufacturing. For example, an etched region shown in a rectangular shape generally has a feature of being curved. Therefore, the regions shown in the accompanying drawings are schematic in nature, and their shapes are not intended to show actual shapes of the regions in an apparatus, and are not intended to limit the scope of the exemplary embodiments.

FIG. 1 is a top view of a display apparatus 1000 provided by some embodiments of the present disclosure. The display apparatus 1000 may be any apparatus that can display images whether in motion (e.g., a video) or stationary (e.g., a still image), and regardless of text or image. More specifically, it is anticipated that the described embodiments may be implemented in or associated with a variety of electronic apparatuses, such as (but not limited to), a mobile phone, a wireless apparatus, a personal digital assistant (PDA), a virtual reality (VR) display, a hand-held or portable computer, a global positioning system (GPS) receiver/navigator, a camera, an moving picture experts group 4 (MP4) video player, a video camera, a game console, a watch, a clock, a calculator, a television monitor, a computer monitor, a computer monitor, an automobile display (e.g., an odometer display), a navigator, a cockpit controller and/or display, a display with camera views (e.g., a display of a rear-view camera in a vehicle), an electronic photo, an electronic billboard or sign, a projector, a building structure, a packaging and aesthetic structure (e.g., a display for displaying an image of a piece of jewelry), and the like.

As shown in FIG. 1, the display apparatus 1000 may include a touch display structure 100.

The touch display structure 100 may be a liquid crystal display (LCD) panel; alternatively, the touch display structure 100 may also be an electroluminescent display panel or a photoluminescent display panel. In a case where the touch display structure 100 is an electroluminescent display panel, the electroluminescent display panel may be an organic electroluminescent (organic light-emitting diode, OLED for short) display panel or a quantum dot electroluminescent (quantum dot light-emitting diode, QLED for short) display panel. In a case where the touch display structure 100 is a photoluminescent display panel, the photoluminescent display panel may be a quantum dot photoluminescent display panel.

For example, the display apparatus 1000 may further include a circuit board, a flexible circuit board, or a driver chip.

The touch display structure 100 has a light-exit surface and a backlight surface, in which the light-exit surface refers to a surface of the touch display structure 100 used to display images, and the backlight surface refers to a surface of the touch display structure 100 away from the light-exit surface.

For example, the driver chip is located on the backlight surface of the touch display structure 100 and is electrically connected to the touch display structure 100; the flexible circuit board is located on the backlight surface of the touch display structure 100 and is electrically connected to the touch display structure 100. The circuit board, the driver chip and the flexible circuit board are used to provide the touch display structure 100 with data signals required for displaying images.

For example, the display apparatus may further include a front frame and a back shell. The front frame is provided on a display surface (the surface that performs light-emitting display) of the touch display structure 100 and surrounds the touch display structure 100. The back shell is provided on a non-display surface of the touch display structure 100 (the surface opposite to the display surface). The back shell is assembled with the front frame to protect and fix the touch display structure 100.

The touch display structure includes a light-emitting substrate and a touch structure. The touch structure is provided on the light-exit surface of the light-emitting substrate (i.e., the surface from which light from the light-emitting substrate is emitted), so that the light transmittance of the touch structure affects the light-exit efficiency of the light-emitting substrate; the higher the light transmittance of the touch structure is, the better the propagation of the light emitted from the light-emitting substrate is, and then the better the display effect of the touch display structure is. In addition, with the development of under-screen optical device (e.g., under-screen fingerprint sensor) technology, in order to improve the sensitivity of the under-screen optical device to the reflection of light from the contacts on the screen (e.g., fingers), the light transmittance of the touch structure provided on the light-exit surface of the light-emitting substrate is increasingly required.

To solve the above technical problem, embodiments of the present disclosure provide a touch display structure 100.

Figure 5:
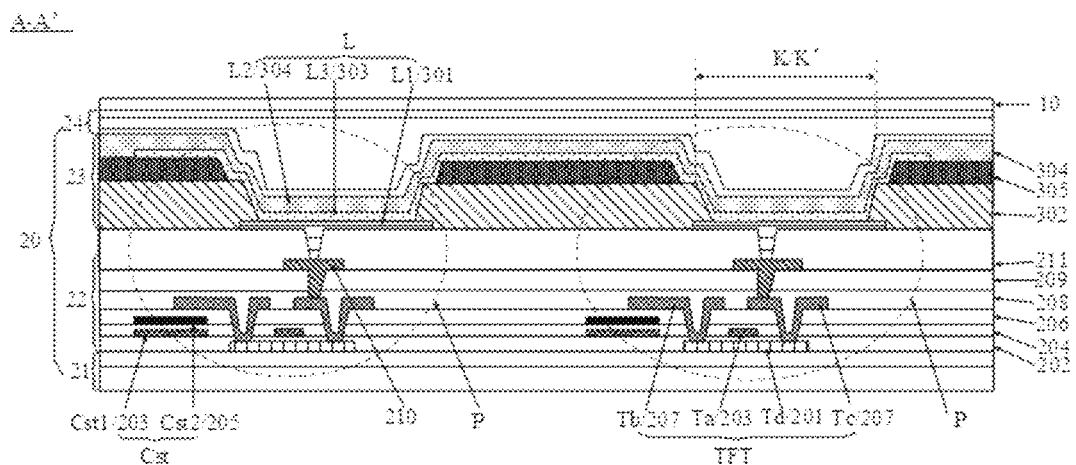
FIG. 5 is a cross-section taken along the section line A-A' in FIG. 1.

The touch display structure 100 includes a light-emitting substrate 20 and a touch structure 10 provided on at least one side of the light-emitting substrate 20 (refer to FIG. 5).

For example, the light-emitting substrate 20 may include a light-exit surface and a backlight surface, in which the light-exit surface refers to a surface from which the light-emitting substrate 20 emits light, and the backlight surface refers to a surface away from the light-exit surface. The touch structure 10 is provided on the light-exit surface of the light-emitting substrate 20 (refer to FIG. 5).

For example, the touch structure 10 can be separately fabricated on a base, and then stacked together with the base on the light-emitting substrate 20, or the touch structure 10 can be directly fabricated on the light-emitting substrate 20.

Figure 2:
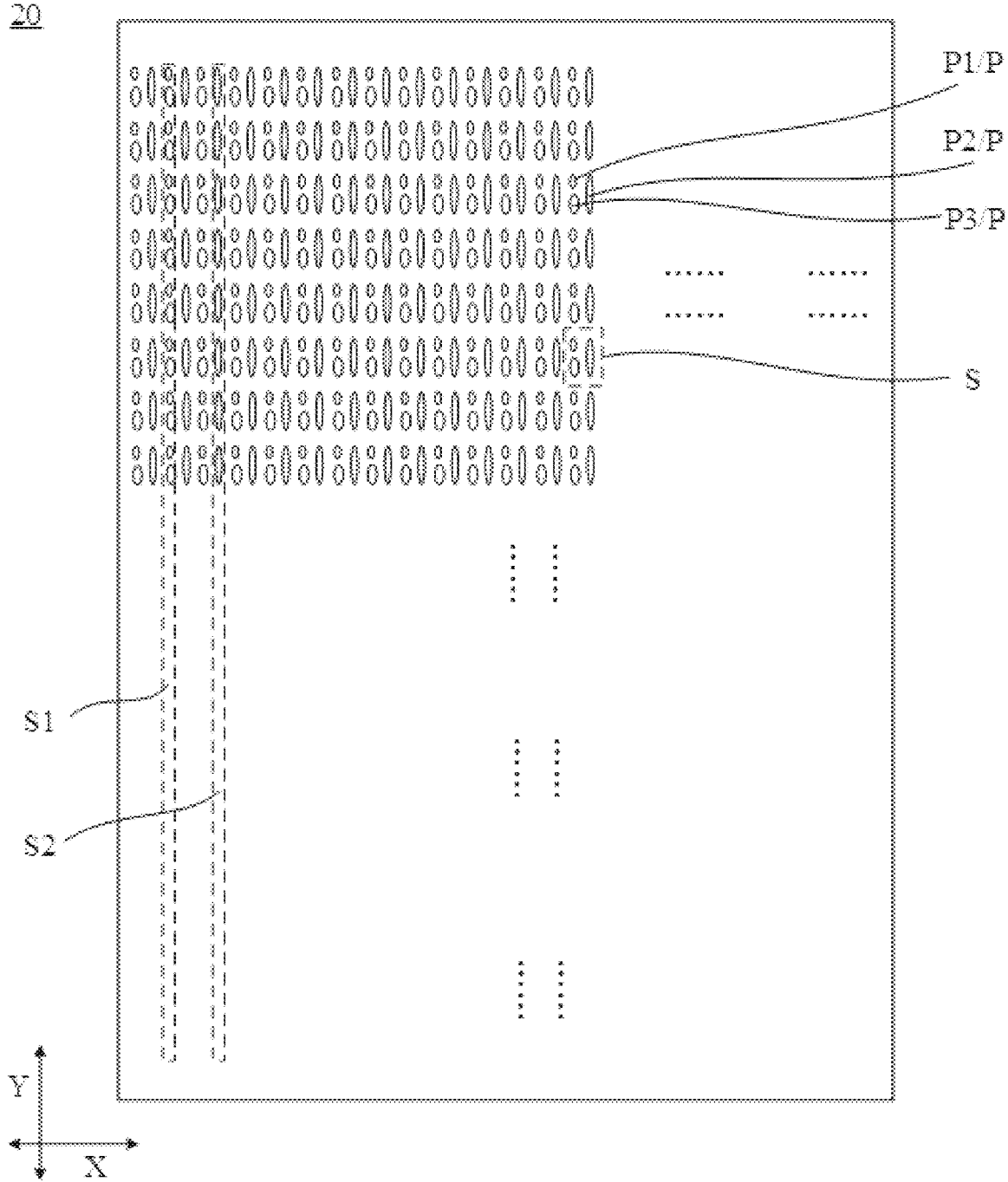
FIG. 2 is a top view of a light-emitting substrate, in accordance with some embodiments.
Figure 3:
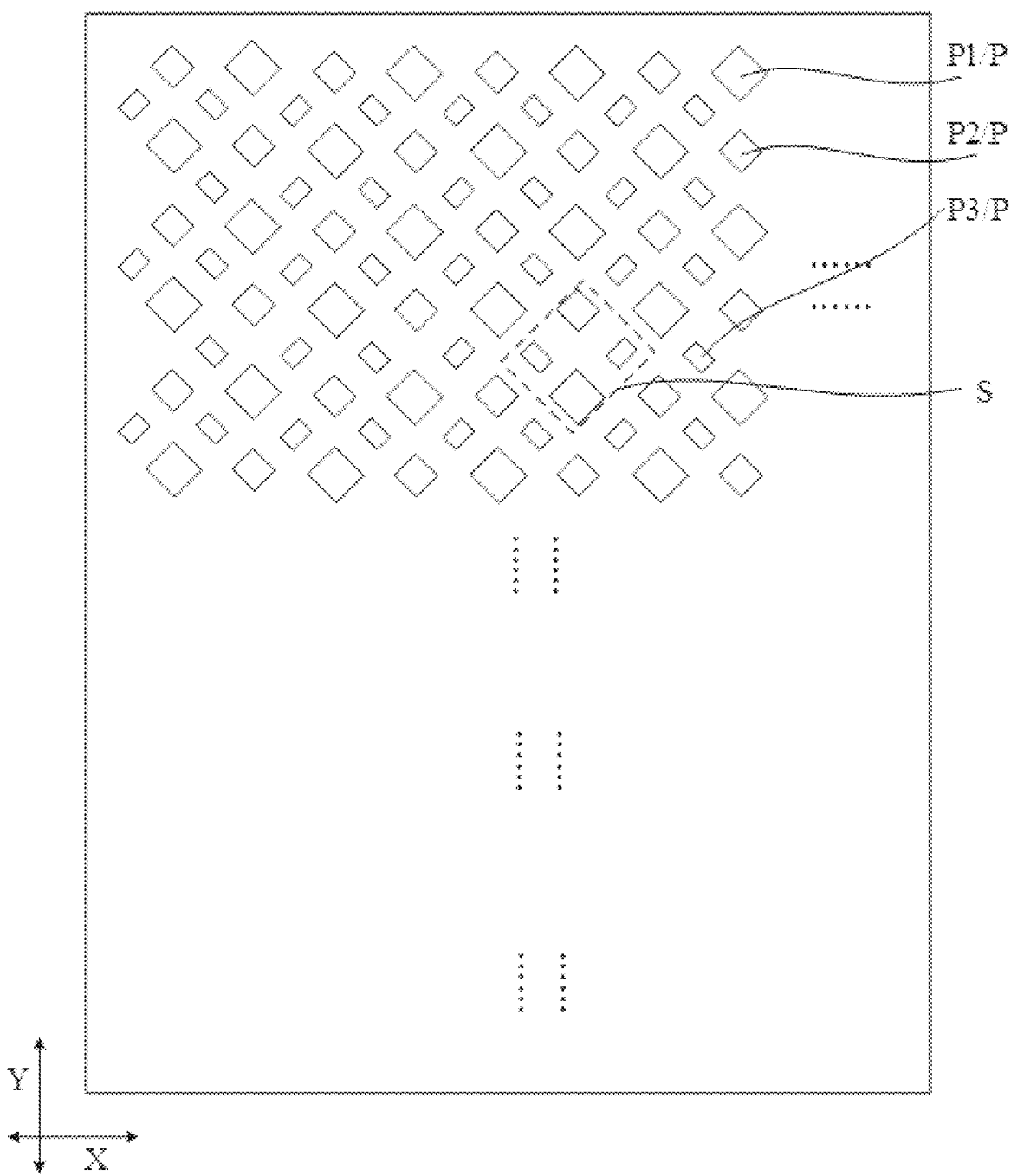
FIG. 3 is another top view of a light-emitting substrate, in accordance with some embodiments.
Figure 4:
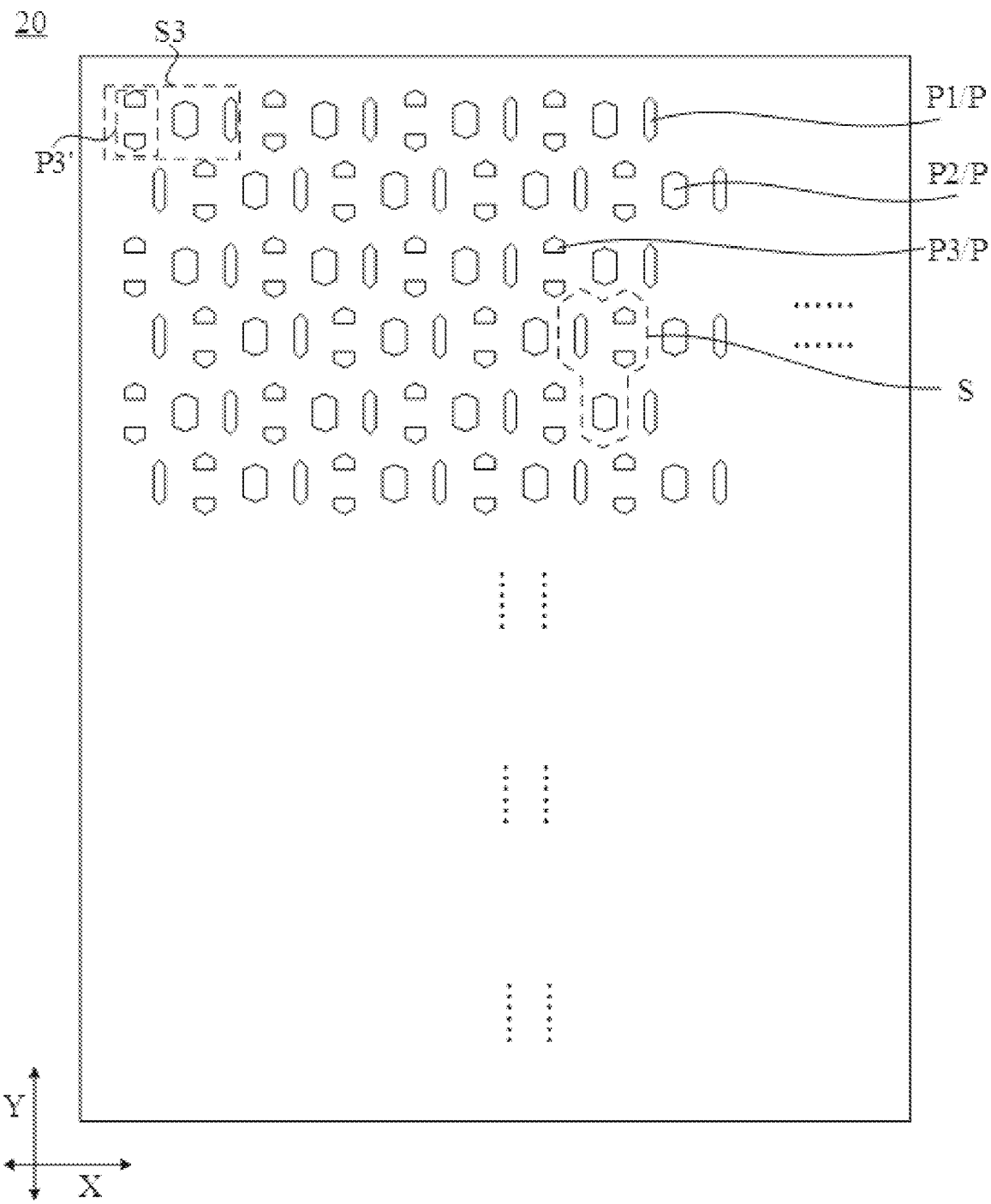
FIG. 4 is yet another top view of a light-emitting substrate, in accordance with some embodiments.

As shown in FIGS. 2 to 4, the light-emitting substrate 20 includes a plurality of sub-pixels P.

For example, each sub-pixel P may emit one of blue light, green light, red light or white light.

For example, the plurality of sub-pixels P may include first sub-pixels P1, second sub-pixels P2 and third sub-pixels P3, and the first sub-pixel P1, the second sub-pixel P2, and the third sub-pixel P3 emit light of different colors, respectively. For example, the first sub-pixel P1 may emit red light, the second sub-pixel P2 may emit green light, and the third sub-pixel P3 may emit blue light.

For example, the plurality of sub-pixels P may be provided in different arrangements.

For example, referring to FIG. 2, the plurality of sub-pixels P are arranged in Real RGB. The plurality of sub-pixels P are divided into a plurality of first pixel columns S1 and a plurality of second pixel columns S2, the first pixel columns S1 and the second pixel columns S2 all extend in a second direction Y, and the plurality of first pixel columns S1 and the plurality of second pixel columns S2 are arranged alternately in a first direction X.

The first pixel column S1 includes a plurality of first sub-pixels P1 and a plurality of third sub-pixels P3 alternately provided along the second direction Y, and the second pixel column S2 includes a plurality of second sub-pixels P2 provided in sequence along the second direction Y.

For example, referring to FIG. 3, multiple sub-pixels P are arranged in a diamond-shape. Among the plurality of sub-pixels P, the first sub-pixels P1 and the second sub-pixels P2 are provided in an alternating arrangement along the second direction Y, and the first sub-pixels P1 and the second sub-pixels P2 are likewise provided in an alternating arrangement along the first direction X; and the third sub-pixels P3 are distributed in an array along the first direction X and the second direction Y.

For example, of the multiple sub-pixels P arranged in the diamond-shape, the sub-pixels P each are in a shape of a rectangle, in which one diagonal of the rectangle extends along the first direction X, and the other diagonal extends along the second direction Y.

For example, of the multiple sub-pixels P arranged in the diamond-shape, the sub-pixels P each are in a shape of an approximate rectangle. For example, the four corners of the rectangle are arc corners.

For example, of the multiple sub-pixels P arranged in the diamond-shape, at least one type of sub-pixel P is a shape of an approximate fan.

For example, referring to FIG. 4, multiple sub-pixels P are arranged in GGRB. The plurality of sub-pixels P are divided into a plurality of pixel groups S3, and the plurality of pixel groups S3 are distributed in an array along the first direction X and the second direction Y.

Each pixel group S3 includes a third pixel group P3', and the third pixel group P3' includes two third sub-pixels P3 arranged along the first direction X. Each pixel group S3 further includes one second sub-pixel P2 and one first sub-pixel P1, and the third pixel group P3', the second sub-pixel P2 and the first sub-pixel P1 are arranged in sequence along the second direction Y.

The first direction X and the second direction Y cross each other. For example, the first direction X and the second direction Y may be perpendicular to each other.

It will be noted that the first direction X may be a horizontal direction of the display apparatus 1000, while the second direction Y may be a vertical direction of the display apparatus 1000; alternatively, the first direction X may be a row direction in which the plurality of sub-pixels P are arranged in the array, while the second direction Y may be a column direction in which the plurality of sub-pixels P are arranged in the array.

The various figures of the present disclosure are illustrated only with the first direction X as the row direction and the second direction Y as the column direction. In the embodiments of the present disclosure, technical solutions obtained by rotating the drawings at a certain angle (e.g., 30 degrees, 45 degrees, or 90 degrees) shall also be included in the protection scope of the present disclosure.

FIG. 5 shows a cross-section taken along the section line A-A' in FIG. 1. As shown in FIG. 5, the light-emitting substrate 20 includes a substrate 21, and a pixel circuit layer 22 and a light-emitting device layer 23 provided in a stack on the substrate 21.

The substrate 21 may be of a single-layer structure or a multi-layer structure. For example, the substrate 21 may include a flexible base layer and a buffer layer that are stacked in sequence. As another example, the substrate 21 may include multiple flexible base layers and multiple buffer layers that are arranged alternately. The material of the flexible base layer may include polyimide, and the material of the buffer layer may include silicon nitride and/or silicon oxide, so as to achieve an effect of blocking moisture, oxygen and alkaline ions.

The pixel circuit layer 22 includes an active layer 201, a first gate insulating layer 202, a first gate conductive layer 203, a second gate insulating layer 204, a second gate conductive layer 205, an interlayer dielectric layer 206, a first source-drain conductive layer 207, a passivation layer 208, a first planarization layer 209, a second source-drain conductive layer 210 and a second planarization layer 211 that are stacked on the substrate 21 in sequence.

Optionally, there may be only one source-drain conductive layer (e.g., only the first source-drain conductive layer 207 or only the second source-drain conductive layer 210), and accordingly, there may be only one planarization layer (e.g., only the first planarization layer 209 or only the second planarization layer 211).

The driving circuit 22 is provided therein with a plurality of thin film transistors TFT and a plurality of capacitor structures Cst. Each sub-pixel P includes at least one thin film transistor TFT and at least one capacitor structure Cst.

FIG. 5 is illustrated only with two of these thin film transistor TFTs and two capacitive structures Cst corresponding thereto.

The thin film transistor TFT includes a gate electrode Ta, a source electrode Tb, a drain electrode Tc, and an active layer pattern Td. The source electrode Tb and the drain electrode Tc are in electrical contact with the active layer pattern Td.

The active layer pattern Td is configured to form a channel under the control of the gate electrode Ta, so that there is conduction between the source electrode Tb and the drain electrode Tc that are connected to the active layer pattern Td, thereby turning on the thin film transistor TFT. For example, the thin film transistor TFT further includes a portion, located between a film layer where the gate electrode Ta is located and a film layer where the active layer pattern Td is located, of the first gate insulating layer 202.

It will be noted that of each thin film transistor TFT, a control electrode is a gate electrode Ta of the transistor, a first electrode is one of a source electrode Tb and a drain electrode Tc of the thin film transistor TFT, and a second electrode is the other of the source electrode Tb and the drain electrode Tc of the thin film transistor TFT. Since the source electrode Tb and the drain electrode Tc of the thin film transistor TFT may be symmetrical in terms of their structure, there may be no difference in structure between the source electrode Tb and the drain electrode Tc.

The capacitor structure Cst includes a first electrode plate Cst1 and a second electrode plate Cst2, in which the first electrode plate Cst1 is located in the first gate conductive layer 203 and the second electrode plate Cst2 is located in the second gate conductive layer 205.

The light-emitting device layer 23 includes an anode layer 301, a pixel definition layer 302, a light-emitting function layer 303, and a cathode layer 304 that are stacked on the pixel circuit layer 22 and away from the substrate 21 in sequence.

The light-emitting device layer 23 is provided therein with a plurality of light-emitting devices L. The light-emitting device L includes an anode L1 located in the anode layer 301, a cathode L2 located in the cathode layer 304, and a light-emitting pattern L3 located in the light-emitting function layer 303.

The anode L1 located in the anode layer 301 is configured to transmit a high-level voltage (e.g., a power supply voltage signal VDD), and the cathode L2 located in the cathode layer 304 is configured to transmit a low-level voltage (e.g., a cathode voltage signal VSS). The light-emitting pattern L3 can emit light due to an electric field formed by the anode L1 and the cathode L2.

For example, other than the light-emitting pattern L3, the light-emitting function layer 303 further includes one or more of an electron transport layer (ETL), an electron injection layer (EIL), a hole transport layer (HTL) and a hole injection layer (HIL).

For example, the anode L1 may be electrically connected to the source electrode Tb or the drain electrode Tc of the thin film transistor TFT, so that the light-emitting device L emits light under the control of the thin film transistor TFT.

As shown in FIG. 5, the pixel definition layer 302 is provided with a plurality of openings K. A light-emitting pattern L3 is at least partially located within an opening K, and light emitted by the light-emitting pattern L3 is emitted to the outside through the opening K.

As shown in FIG. 5, each sub-pixel P includes a light-emitting region K'. The light-emitting region K' is a region bounded by the opening K, that is, the light-emitting region K' is an effective light-emitting region of the sub-pixel P.

For example, as shown in FIG. 5, the pixel definition layer 302 and the cathode layer 304 may further be provided with a support layer 305 therebetween. The support layer 305 can play a role in supporting a protective film layer to avoid breakage of the anode layer 301 or other traces due to the contact of the protective film layer with the anode layer 301 or other traces.

For example, as shown in FIG. 5, the light-emitting substrate 20 may further include an encapsulation layer 24 provided on a side of the light-emitting devices L away from the substrate 21. The encapsulation layer 24 may include a first encapsulation sub-layer, a second encapsulation sub-layer, and a third encapsulation sub-layer that are sequentially provided in a stack away from the substrate 21. For example, the materials of the first encapsulation sub-layer and the third encapsulation sub-layer include inorganic materials, and the material of the second encapsulation sub-layer includes an organic material. The first encapsulation sub-layer and the third encapsulation sub-layer have a function of blocking moisture and oxygen, and the second encapsulation sub-layer has certain flexibility and a function of absorbing moisture.

Figure 6:
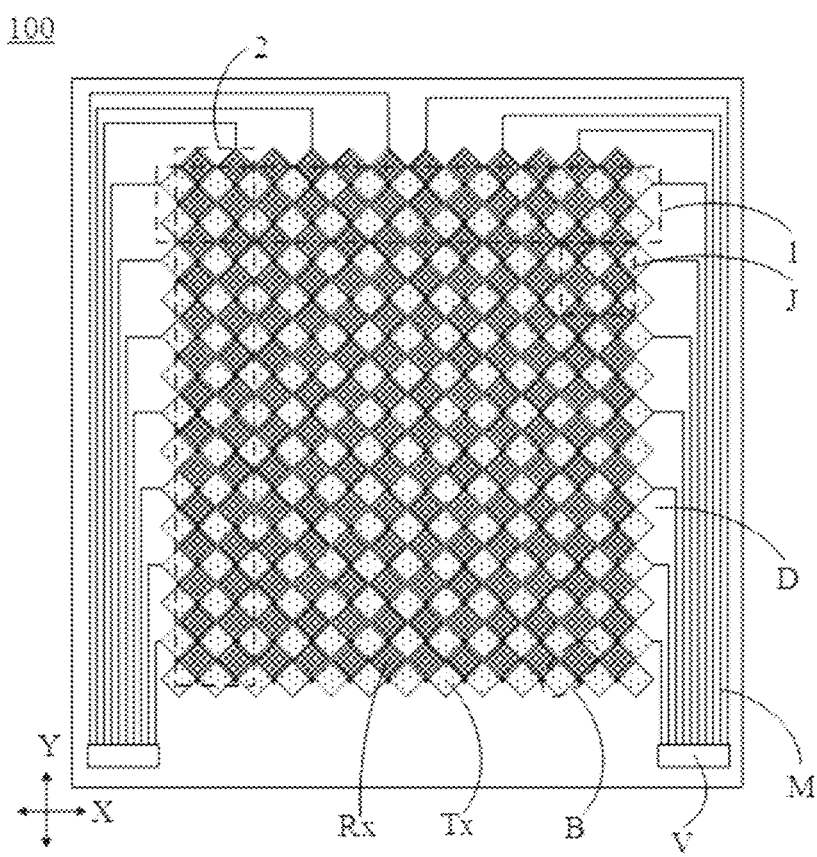
FIG. 6 is a top view of a touch display structure, in accordance with some embodiments.

As shown in FIG. 6, the touch structure 10 includes a plurality of first touch electrodes Tx and a plurality of second touch electrodes Rx.

Figure 7:
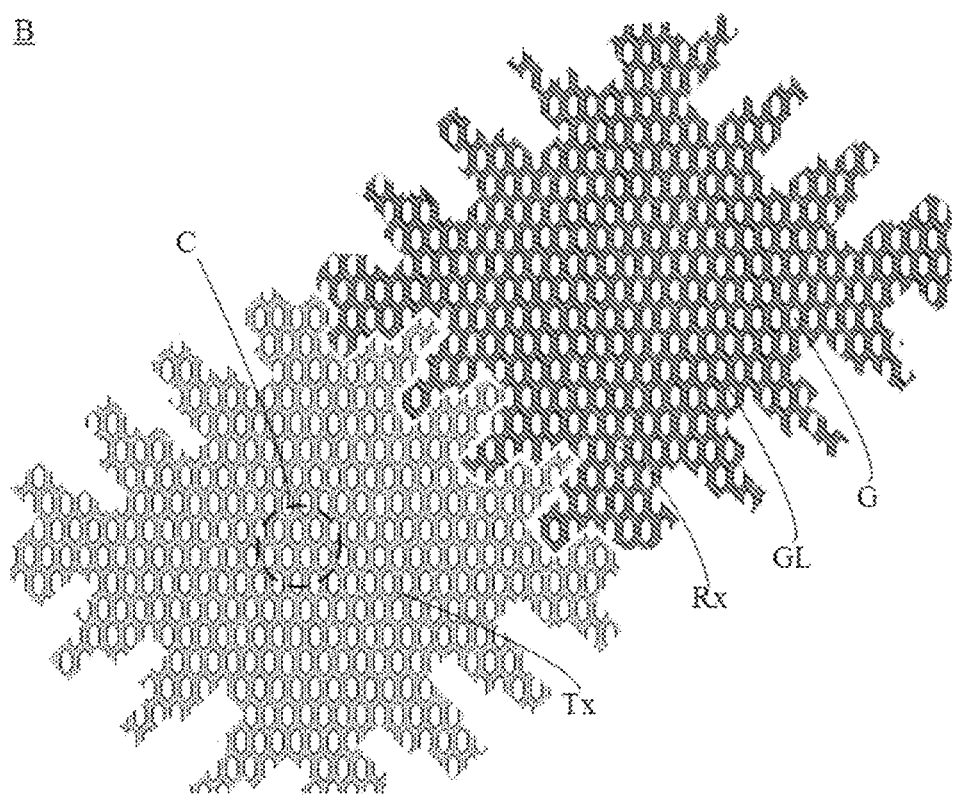
FIG. 7 is an enlarged view of a structure corresponding to a region where the dotted line frame B in FIG. 6 is located.

As shown in FIG. 7, the touch structure 10 includes a plurality of metal lines GL, and the plurality of metal lines GL cross each other to form a plurality of metal grid squares G.

For example, as shown in FIG. 7, in the touch structure 10, the touch electrode adopts a metal grid square structure (i.e., including multiple metal grid squares G). Compared to the use of ITO (Indium Tin Oxide) to form a planar electrode as the touch electrode, the touch electrode of the metal grid square structure has lower resistance and higher sensitivity, which may improve the touch sensitivity of the touch structure 10. In addition, the touch electrode using the metal grid square structure has high mechanical strength and may reduce the weight of the touch structure 10. In a case where the touch structure 10 is used in the display apparatus 1000, the display apparatus 1000 may be made lighter and thinner.

It will be noted that the above-mentioned touch electrodes of the metal grid square structure include all first touch electrodes Tx and all second touch electrodes Rx in the touch structure 10.

For example, as shown in FIG. 7, the first touch electrodes Tx and the second touch electrodes Rx each adopt a metal grid square structure. Metal grid squares G of the first touch electrodes Tx and the second touch electrodes Rx may be provided in the same film layer, and metal grid squares G of a first touch electrode Tx are separated from metal grid squares G of a second touch electrode Rx, thereby insulating the first touch electrode Tx and the second touch electrode Rx from each other.

It will be noted that the use of different filling patterns for the metal grid square G in FIG. 7 is to distinguish between different touch electrodes, and the metal grid squares G of the first touch electrode Tx and the second touch electrode Rx may be made of the same material and formed using the same process.

For example, as shown in FIG. 7, the first touch electrode Tx and the second touch electrode Rx are each in a shape of a rhombus or an approximate rhombus. Here, "approximate rhombus" means that the touch electrodes (i.e., the first touch electrode Tx and the second touch electrode Rx) are each in a shape of a rhombus as a whole, but are not limited to a standard rhombus. For example, boundaries of the touch electrodes are allowed to be non-linear (such as in a shape of a zigzag); as another example, the touch electrode involved in the following embodiments is in a shape of a rhombus as a whole, but its boundary is in a shape of a zigzag.

Furthermore, in the embodiments of the present disclosure, the electrode pattern shapes of the first touch electrode Tx and the second touch electrode Rx are not limited to a rhombus or an approximate rhombus, and may, for example, also be rectangle, an elongated strip, and the like.

For example, depending on how the metal lines GL cross, the shape of the metal grid square G may be roughly a hexagon, a rectangle, or an irregular polygon.

As shown in FIG. 5, the touch structure 10 is provided on a side of the light-emitting substrate 20.

Figure 8:
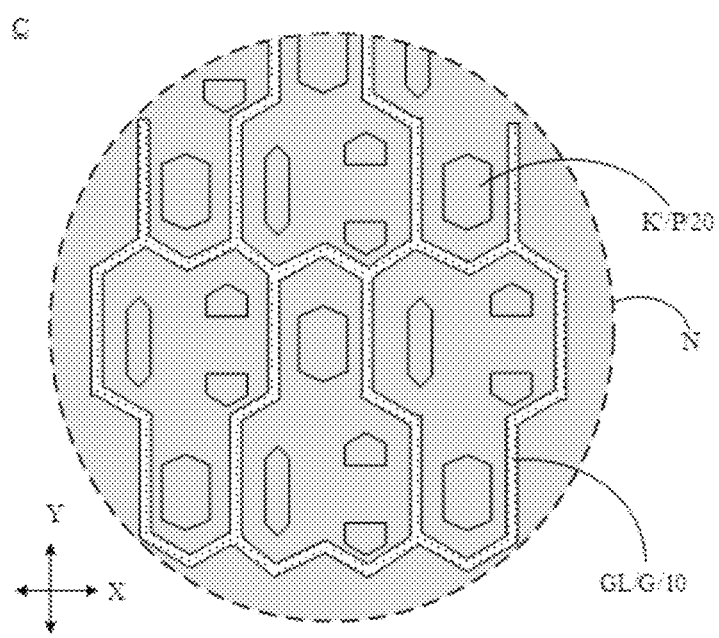
FIG. 8 is an enlarged view of a structure corresponding to a region where the dotted line frame C in FIG. 7 is located.

As shown in FIG. 8, orthographic projections of the light-emitting regions K' of at least two sub-pixels P on a reference surface N are located within a range of an orthographic projection of the same metal grid square G on the reference surface N.

Here, the reference surface N is a plane where the light-emitting substrate 20 is located; alternatively, the reference surface N may be a plane parallel to the light-emitting substrate 20.

For example, the metal line GL is arranged to avoid the light-emitting region K' of the sub-pixel P, that is, an orthographic projection of the metal line GL on the reference surface N is staggered from an orthographic projection of the light-emitting region K' of the sub-pixel P on the reference surface N. This may prevent the metal line GL of the touch structure 10 from blocking the light emitted by the sub-pixel P, resulting in a decrease in light transmission efficiency.

Figure 9:
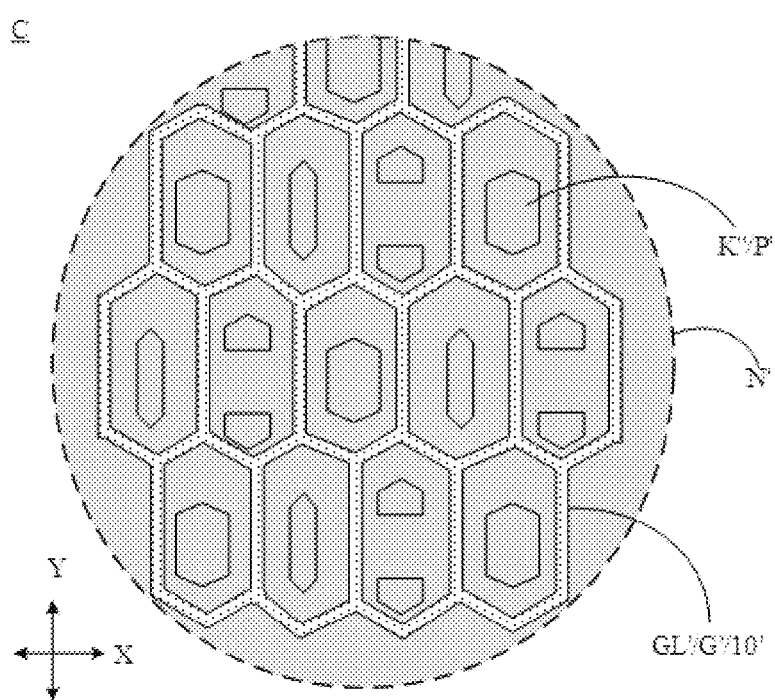
FIG. 9 is an enlarged view of another structure corresponding to a region where the dotted line frame C in FIG. 7 is located.

As shown in FIG. 9, in the related art, an orthographic projection of alight-emitting region K" of a sub-pixel P' on a reference surface N' is located within a range of an orthographic projection of a metal grid square G' on the reference surface N'. That is, one metal grid square G' corresponds to one sub-pixel P'. Referring to FIG. 9, the distribution density of the metal lines GL' is relatively high, the light transmittance of the touch structure 10' is low, and the display effect of the touch display structure is poor.

The light transmittance of the touch structure 10 is related to the distribution density of the metal lines GL. That is, in a unit area, the larger the number of metal lines GL are distributed and the smaller the area of the metal grid square G, the lower the light transmittance of the touch structure 10 will be. In the touch structure 10 provided by the embodiments of the present disclosure, by arranging the orthographic projections of the light-emitting regions K' of at least two sub-pixels P on the reference surface N to be located within the range of the orthographic projection of the same metal grid square G on the reference surface N, the distribution density of the metal lines GL is reduced and the area of the metal grid square G is expanded, thereby increasing the light transmittance of the touch structure 10 and optimizing the display effect of the touch display structure 100.

For example, some of the metal lines GL may be removed to reduce the distribution density of the metal lines GL and expand the area of the metal grid square G.

However, the inventors of the present disclosure found that after removing some of the metal lines GL, reducing the distribution density of the metal lines GL, and expanding the area of the metal grid square G, although the light transmittance of the touch structure 10 is greatly improved, however, correspondingly, the resistance of the touch structure 10 increases sharply, which greatly affects the touch sensitivity of the touch structure 10 and affects the touch effect.

In order to solve this technical problem, in the touch display structure 100 provided by the embodiments of the present disclosure, as shown in FIG. 6, the touch structure 10 includes a plurality of first touch channels 1 extending along the first direction X, and a plurality of second touch channels 2 extending in the second direction Y.

The first direction X and the second direction Y cross each other. For example, the first direction X and the second direction Y may be perpendicular to each other.

It will be noted that, the aforementioned "first touch channel 1" is a channel composed of multiple first touch electrodes Tx that are electrically connected to each other in the touch structure 10 and transmit the same touch signal simultaneously; the aforementioned "second touch channel 2" is a channel composed of multiple second touch electrodes Rx that are electrically connected to each other in the touch structure 10 and transmit another same touch signal simultaneously.

As shown in FIG. 6, each of the touch channels (including the first touch channels 1 and the second touch channels 2) is connected to respective at least one touch line M, and touch lines M connected to the plurality of touch channels are collected into bonding regions V, and finally electrically connected to a touch processor (not shown in the figure). The touch processor transmits touch signals to the touch channels through the touch lines M to achieve the touch effect of the touch structure 10.

Figure 10:
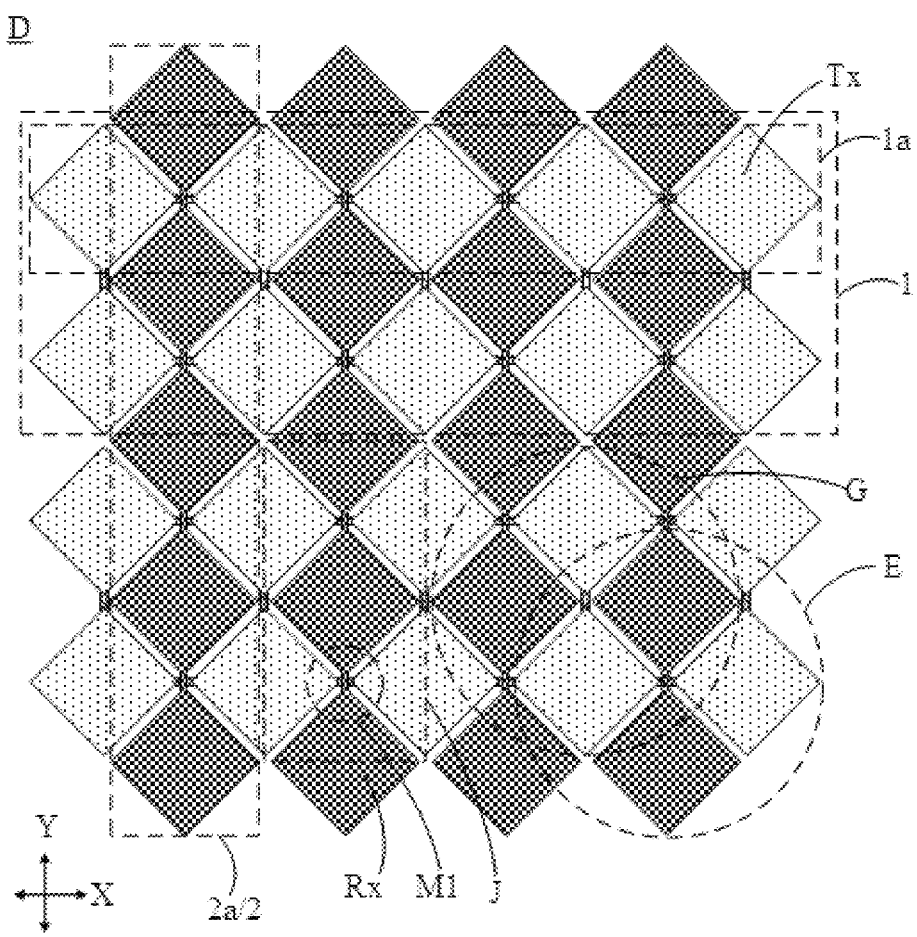
FIG. 10 is an enlarged view of a structure corresponding to a region where the dotted line frame D in FIG. 6 is located.

As shown in FIG. 10, at least one first touch channel 1 includes multiple adjacent first sub-touch channels 1a. For example, referring to FIG. 10, a first touch channel 1 includes two adjacent first sub-touch channels 1a, and a second touch channel 2 includes one second sub-touch channel 2a.

Figure 11:
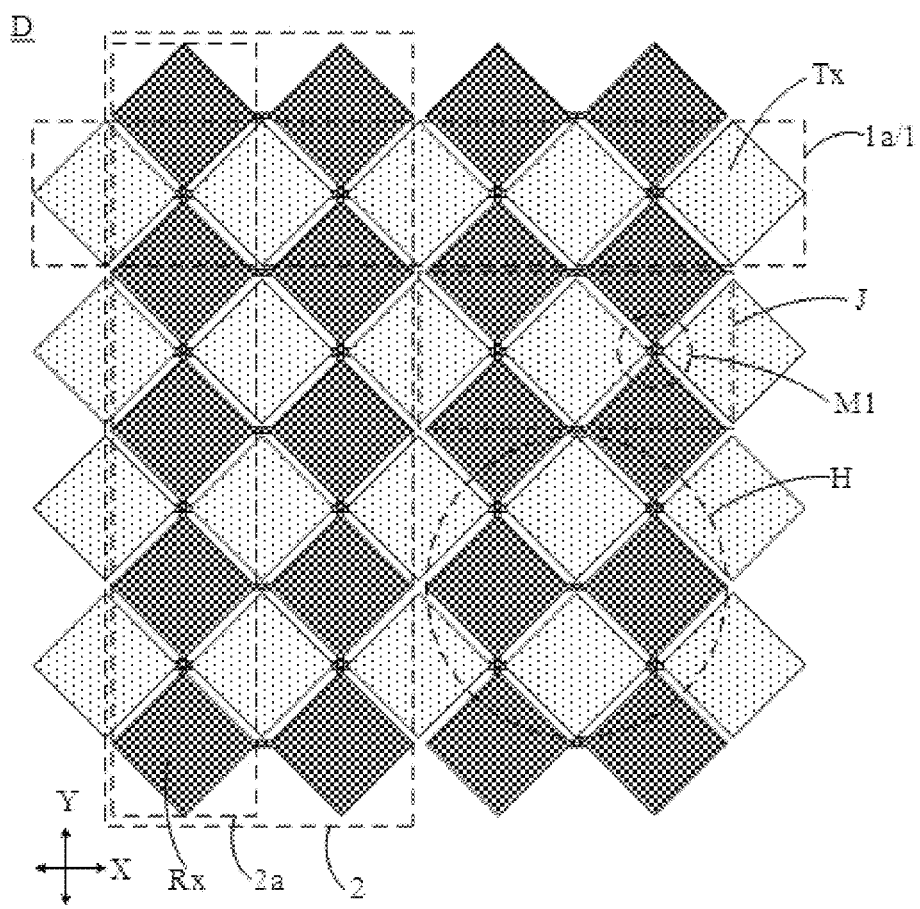
FIG. 11 is an enlarged view of another structure corresponding to a region where the dotted line frame D in FIG. 6 is located.

As shown in FIG. 11, at least one second touch channel 2 includes multiple adjacent second sub-touch channels 2a. For example, referring to FIG. 11, a first touch channel 1 includes one first sub-touch channel 1a, and a second touch channel 2 includes two adjacent second sub-touch channels 2a.

Figure 12:
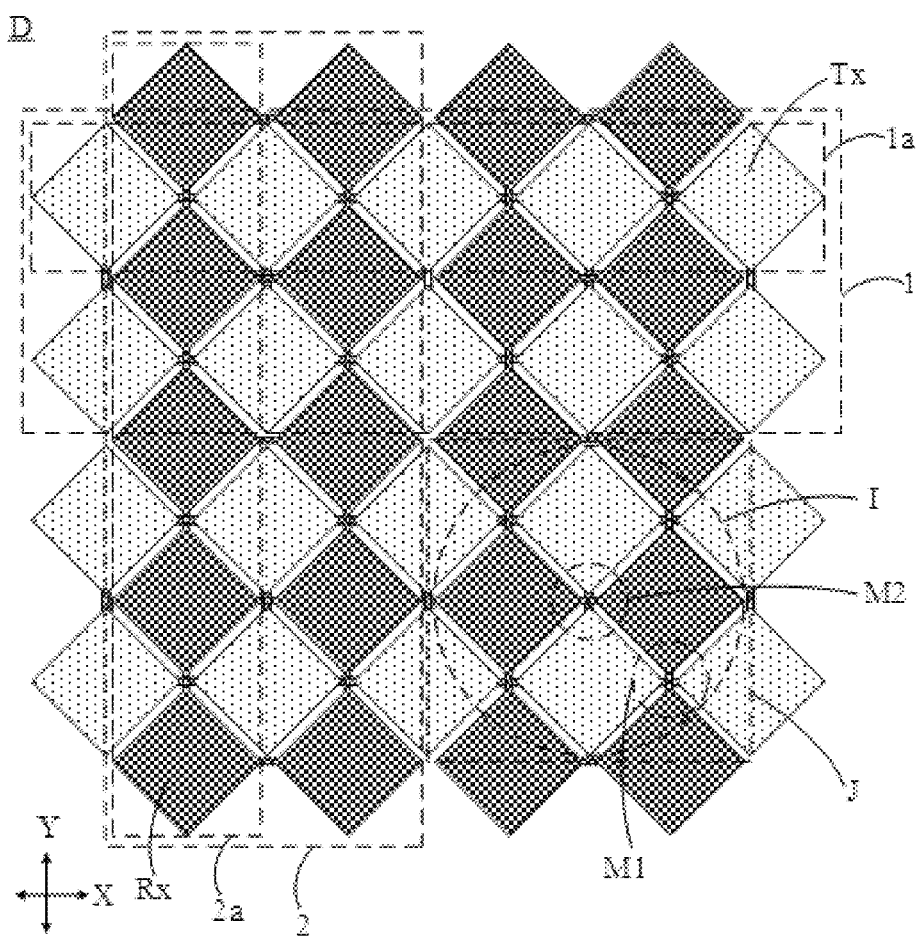
FIG. 12 is an enlarged view of yet another structure corresponding to a region where the dotted line frame D in FIG. 6 is located.

As shown in FIG. 12, at least one first touch channel 1 includes multiple adjacent first sub-touch channels 1a, and at least one second touch channel 2 includes multiple adjacent second sub-touch channels 2a. For example, referring to FIG. 12, a first touch channel 1 includes two adjacent first sub-touch channels 1a, and a second touch channel 2 includes two adjacent second sub-touch channels 2a.

On the basis of the foregoing embodiments, in the same first touch channel 1, two adjacent first sub-touch channels 1a are electrically connected to each other; and in the same second touch channel 2, two adjacent second sub-touch channels 2a are electrically connected to each other.

For example, as shown in FIGS. 6, 10 and 12, in the same first touch channel 1, two first touch electrodes Tx respectively belonging to two adjacent first sub-touch channels 1a are electrically connected to each other, thereby realizing the purpose of electrically connecting the two adjacent first sub-touch channels 1a in the same first touch channel 1, and thereby causing the multiple first sub-touch channels 1a in the same first touch channel 1 to all transmit the same touch signal.

Figure 13:
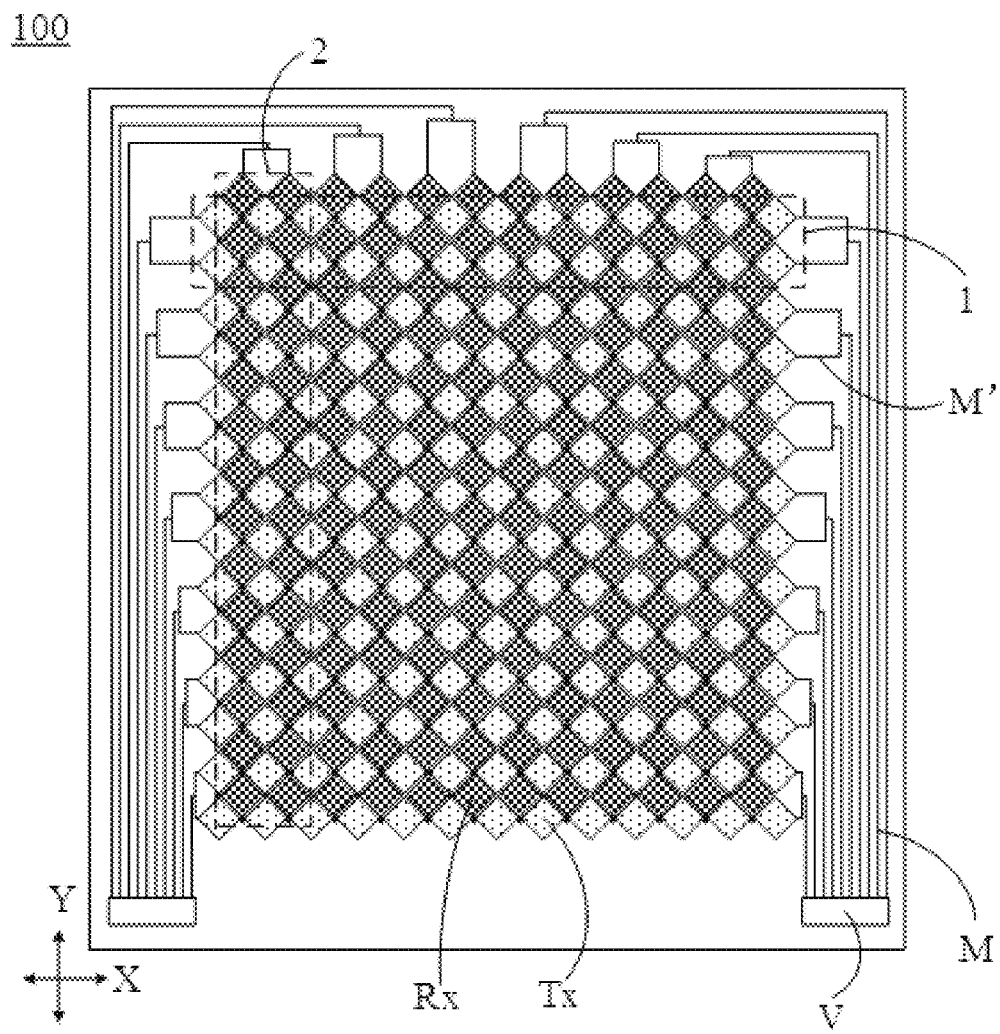
FIG. 13 is another top view of a touch display structure, in accordance with some embodiments.

For example, as shown in FIG. 13, in the same first touch channel 1, two adjacent first sub-touch channels 1a may be electrically connected to the same touch line M through different sub-touch lines M', thereby causing the multiple first sub-touch channels 1a in the same first touch channel 1 to all transmit the same touch signal.

For example, as shown in FIGS. 6, 11 and 12, in the same second touch channel 2, two second touch electrodes Rx respectively belonging to two adjacent second sub-touch channels 2a are electrically connected to each other, thereby realizing the purpose of electrically connecting the two adjacent second sub-touch channels 2a in the same second touch channel 2, and thereby causing the multiple second sub-touch channels 2a in the same second touch channel 2 to all transmit the same touch signal.

For example, as shown in FIG. 13, in the same second touch channel 2, two adjacent second sub-touch channels 2a may be electrically connected to another same touch line M through different sub-touch lines M', thereby causing the multiple second sub-touch channels 2a in the same second touch channel 2 to all transmit the same touch signal.

As shown in FIGS. 10 to 12, the first sub-touch channel 1a includes multiple first touch electrodes Tx arranged along the first direction X and electrically connected to each other in sequence, and the second sub-touch channel 2a includes multiple second touch electrodes Rx arranged along the second direction Y and electrically connected to each other in sequence.

The plurality of first touch electrodes 1 and the plurality of second touch electrodes 2 are insulated from each other, and the plurality of first touch channels 1 and the plurality of second touch channels 2 cross each other, so that the first touch electrodes Tx and the second touch electrodes Rx are alternately arranged.

For example, as shown in FIGS. 10 to 12, the first touch electrodes Tx and the second touch electrodes Rx are alternately arranged, and different adjacent touch electrodes are insulated and capable of generating mutual capacitance therebetween (i.e., between the first touch electrode Tx and the second touch electrode Rx), and the mutual capacitance value of these touch electrodes changes after being touched, so that it may be possible to determine the change amount of the mutual capacitance value before and after the touch through detecting the mutual capacitance value, and carry out a determination of a touch position, so as to realize the touch effect of the touch structure 10.

For example, referring to FIG. 7, the first touch electrode Tx and the second touch electrode Rx are insulated from each other by separating the metal grid squares G of the first touch electrode Tx from the metal grid squares G of the second touch electrode Rx.

Based on the above embodiments, in order to achieve an electrical connection between adjacent first touch electrodes Tx in the same first sub-touch channel 1a, an electrical connection between adjacent second touch electrodes Rx in the same second sub-touch channel 2a, and the effect of insulating the first touch electrode Tx and the second touch electrode Rx from each other, at a position where the first touch channel 1 crosses the second touch channel 2, at least one pair of touch electrodes (first touch electrodes Tx or second touch electrodes Rx) are electrically connected through a connection portion (i.e., two connection portions that cross each other and insulated from each other form a connection structure).

Figure 14:
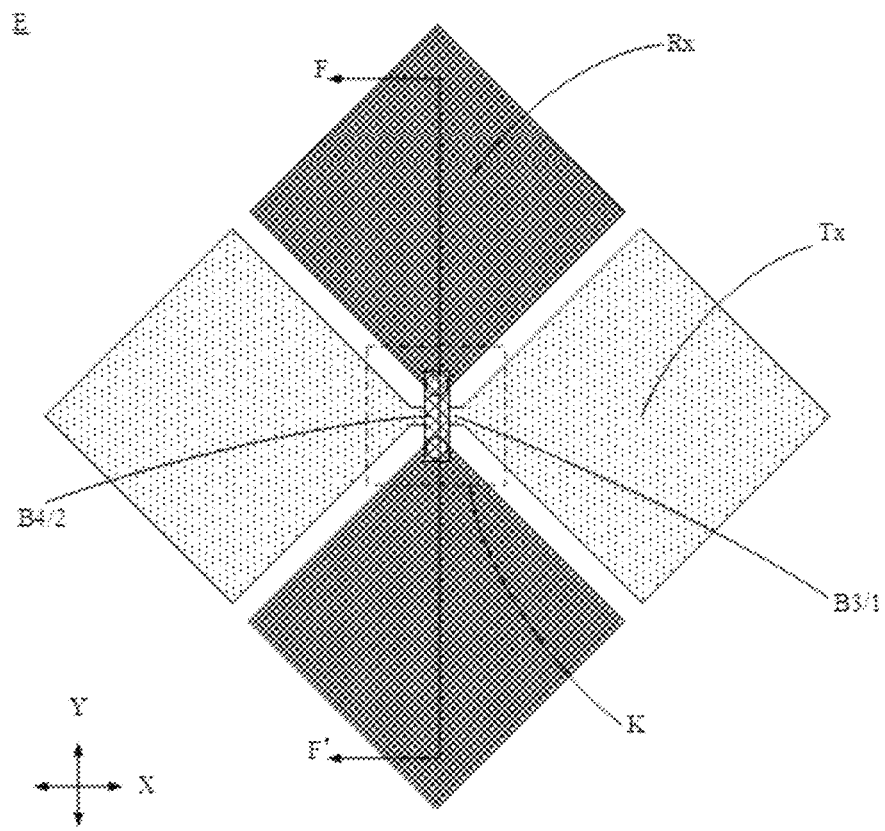
FIG. 14 is an enlarged view of a structure corresponding to a region where the dotted line frame E in FIG. 10 is located.

For example, referring to FIG. 14, two adjacent first touch electrodes Tx arranged along the first direction X are electrically connected through a third connection portion B3, and two adjacent second touch electrodes Rx arranged along the second direction Y are electrically connected through a fourth connection portion B4. The third connection portion B3 and the fourth connection portion B4 arranged to cross each other are insulated from each other, thereby achieving mutual insulation between the first touch electrode Tx and the second touch electrode Rx.

Figure 15:
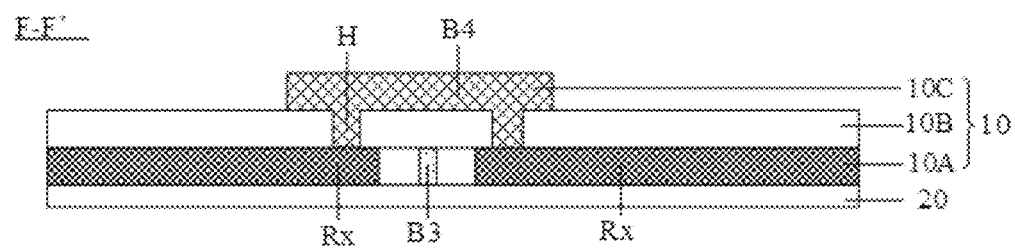
FIG. 15 is a cross-section taken along the section line F-F' in FIG. 14.

For example, as shown in FIG. 15, the touch structure 10 includes a first conductive layer 10A, an insulating layer 10B, and a second conductive layer 10C that are provided in a stack. The insulating layer 10B is located between the first conductive layer 10A and the second conductive layer 10C.

The first touch electrodes Tx and the second touch electrodes Rx are provided in the same layer (e.g., all provided in the first conductive layer 10A or all in the second conductive layer 10B), and the third connection portion B3 and the fourth connection portion B4 are provided in different film layers, and an insulation between a film layer (e.g., the first conductive layer 10A) in which the third connection portion B3 is located and a film layer (e.g., the second conductive layer 10C) in which the fourth connection portion B4 is located is realized by the insulating layer 10B, thereby insulating the third connection portion B3 and the fourth connection portion B4 from each other.

Through research, the inventors of the present disclosure found that in the touch structure 10, compared with a position where the touch electrodes (including the first touch electrode Tx and the second touch electrode Rx) are located, there are two layers of conductive metal at a position where the connection structure (such as the third connection portion B3 and the fourth connection portion B4) is located. The larger the number of connection structures, the more corresponding two layers of conductive metal, which may make the resistance of the touch structure 10 lower.

Figure 16:
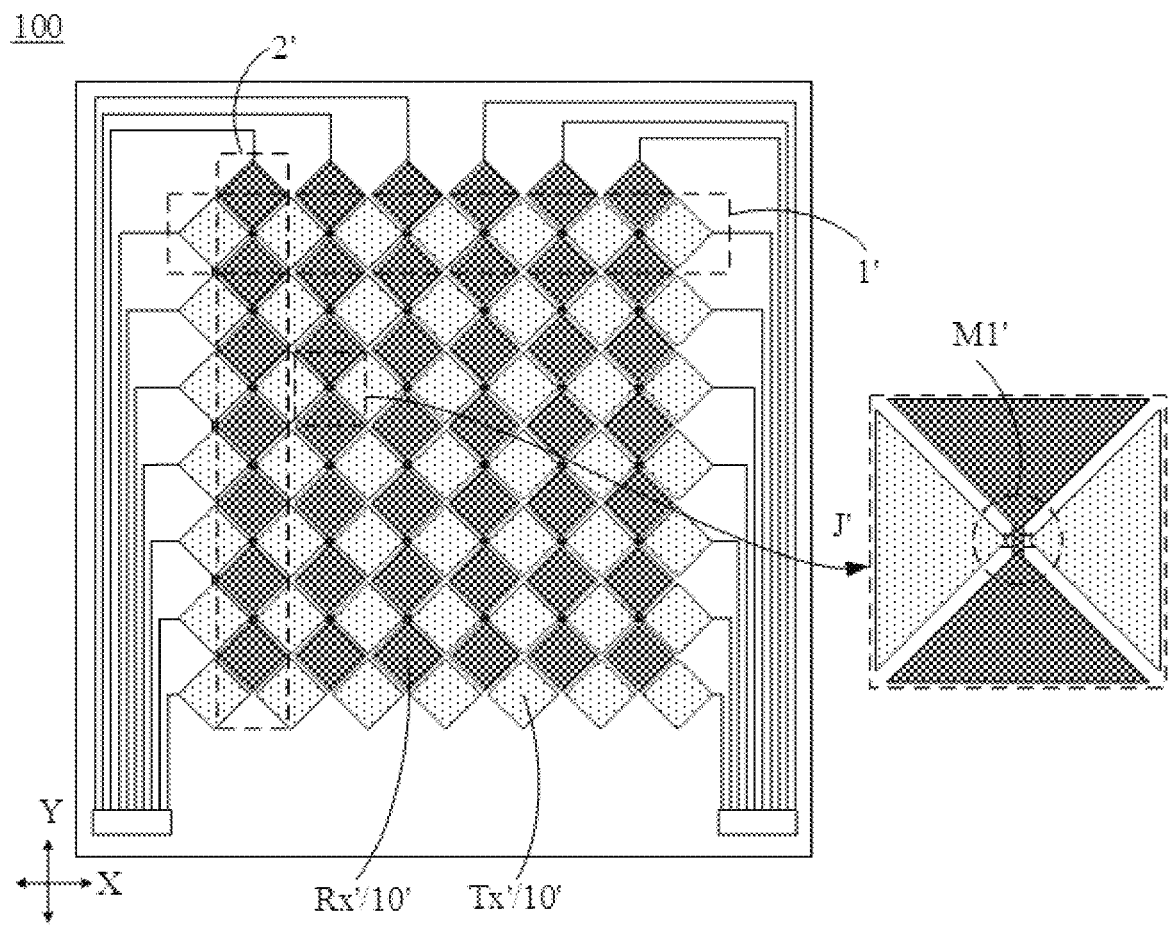
FIG. 16 is yet another top view of a touch display structure, in accordance with some embodiments.

In the related art, as shown in FIG. 16, each touch channel (first touch channel 1' or second touch channel 2') is provided therein with only one sub-touch channel (first sub-touch channel 1a' or second sub-touch channel 2a'). Referring to FIG. 16, it can be seen that after the first touch channel 1' crosses the second touch channel 2', the number of connection structures formed in the whole screen of the touch structure 10' is small.

In the touch structure 10 provided in embodiments of the present disclosure, by providing the multiple adjacent sub-touch channels (including the first sub-touch channels 1a and the second sub-touch channels 2a) within at least one touch channel (including the first touch channel 1 and the second touch channel 2), and by providing an electrical connection between multiple sub-touch channels in the same touch channel, it is possible to increase the number of touch electrodes (including the first touch electrodes Tx and the second touch electrodes Rx) in the touch channel without changing the number of touch channels in the touch structure 10 and avoiding increasing the load of the touch chip, so that the number of connection structures (e.g., the third connection portion B3 and the fourth connection portion B4) for electrically connecting adjacent touch electrodes in the whole screen of the touch structure 10 may be increased. By increasing the number of connection structures for electrically connecting adjacent touch electrodes to each other, the overall resistance of the touch structure 10 may be lowered to ensure that after removing some of the metal lines GL and increasing the light transmittance of the touch structure 10, the resistance of the touch structure 10 remains within a range that can satisfy the normal touch function, thereby optimizing the touch effect of the touch structure 10.

In some embodiments, as shown in FIGS. 10 and 12, along the second direction Y, for the two adjacent first sub-touch channels 1a in the same first touch channel 1, first touch electrodes Tx in one first sub-touch channel 1a are provided in one-to-one correspondence with first touch electrodes Tx in the other first sub-touch channel 1a. Referring to FIG. 12, the first touch channel 1 includes two first sub-touch channels 1a arranged adjacent to each other; and two first touch electrodes Tx, respectively belonging to different first sub-touch channels 1a in the same first touch channel 1 and arranged adjacent to each other in the second direction Y, are arranged in one-to-one correspondence.

Referring to FIG. 12, at least one pair of correspondingly arranged first touch electrodes Tx are electrically connected. Here, "at least one pair of correspondingly arranged first touch electrodes Tx" are two first touch electrodes Tx respectively belonging to different first sub-touch channels 1a in the same first touch channel 1 and arranged adjacent to each other in the second direction Y.

By arranging at least one pair of correspondingly arranged first touch electrodes Tx to be electrically connected, the multiple first sub-touch channels 1a located in the same first touch channel 1 are electrically connected, so that the multiple first sub-touch channels 1a located in the same first touch channel 1 transmit the same touch signal to avoid increasing the number of touch channels, thereby avoiding increasing the load of the touch chip.

For example, in the same first touch channel 1, only one pair of correspondingly arranged first touch electrodes Tx are electrically connected to each other. Alternatively, for example, in the same first touch channel 1, some of the correspondingly arranged first touch electrodes Tx are electrically connected, and some of the correspondingly arranged first touch electrodes Tx are separated. Alternatively, for example, in the same first touch channel 1, each pair of correspondingly arranged first touch electrodes Tx are electrically connected.

The correspondingly arranged first touch electrodes Tx are electrically connected through a connection portion, and by controlling the number of electrically connected and correspondingly arranged pairs of first touch electrodes Tx, that is, controlling the number of connection portions that enable an electrical connection between the correspondingly arranged first touch electrodes Tx may control the magnitude of the resistance of the touch structure 10, with the more connection portions and the more conductive metal in the touch structure 10, the lower the resistance of the touch structure 10.

Figure 17:
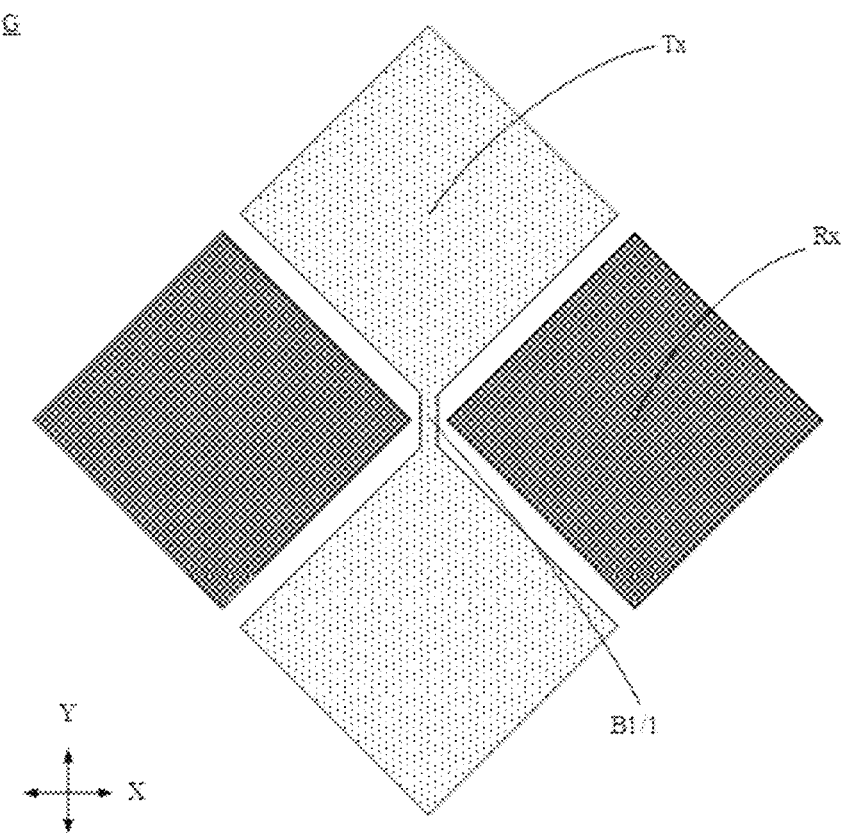
FIG. 17 is an enlarged view of a structure corresponding to a region where the dotted line frame G in FIG. 10 is located.

In an exemplary embodiment, as shown in FIG. 17, the first touch channel 1 further includes a first connection portion B1, and at least one pair of correspondingly arranged first touch electrodes Tx are electrically connected through the first connection portion B1. The first connection portion B1 extends approximatively along the second direction Y.

For example, the first touch electrodes Tx may be integrally provided with the first connection portion B1.

For example, at least one first connection portion B1 may be included in the same first touch channel 1, and the first connection portion B1 enables an electrical connection between the multiple first sub-touch channels 1a located in the same first touch channel 1, thereby causing the multiple first sub-touch channels 1a located in the same first touch channel 1 to transmit the same touch signal. By controlling the number of the first connection portions B1, the magnitude of the resistance of the touch structure 10 may be controlled, and the larger the number of the first connection portions B1, the smaller the resistance of the touch structure 10.

In some embodiments, as shown in FIGS. 11 and 12, along the first direction X, for the two adjacent second sub-touch channels 2a in the same second touch channel 2, second touch electrodes Rx in one second sub-touch channel 2a are provided in one-to-one correspondence with second touch electrodes Rx in the other second sub-touch channel 2a. Referring to FIG. 12, the second touch channel 2 includes two second sub-touch channels 2a arranged adjacent to each other; and two second touch electrodes Rx, respectively belonging to different second sub-touch channels 2a in the same second touch channel 2 and arranged adjacent to each other in the first direction X, are arranged in one-to-one correspondence.

At least one pair of correspondingly arranged second touch electrodes Rx are electrically connected. Here, "at least one pair of correspondingly arranged second touch electrodes Rx" are two second touch electrodes Rx respectively belonging to different second sub-touch channels 2a in the same second touch channel 2 and arranged adjacent to each other in the first direction X.

By arranging at least one pair of correspondingly arranged second touch electrodes Rx to be electrically connected, the multiple second sub-touch channels 2a located in the same second touch channel 2 are electrically connected, so that the multiple second sub-touch channels 2a located in the same second touch channel 2 transmit the same touch signal to avoid increasing the number of touch channels, thereby avoiding increasing the load of the touch chip.

For example, in the same second touch channel 2, only one pair of correspondingly arranged second touch electrodes Rx are electrically connected to each other. Alternatively, for example, in the same second touch channel 2, some of the correspondingly arranged second touch electrodes Rx are electrically connected, and some of the correspondingly arranged second touch electrodes Rx are separated. Alternatively, for example, in the same second touch channel 21, each pair of correspondingly arranged second touch electrodes Rx are electrically connected.

The correspondingly arranged second touch electrodes Rx are electrically connected through a connection portion, and by controlling the number of electrically connected and correspondingly arranged pairs of second touch electrodes Rx, that is, controlling the number of connection portions that enable an electrical connection between the correspondingly arranged second touch electrodes Rx may control the magnitude of the resistance of the touch structure 10, with the more connection portions and the more conductive metal in the touch structure 10, the lower the resistance of the touch structure 10.

Figure 18:
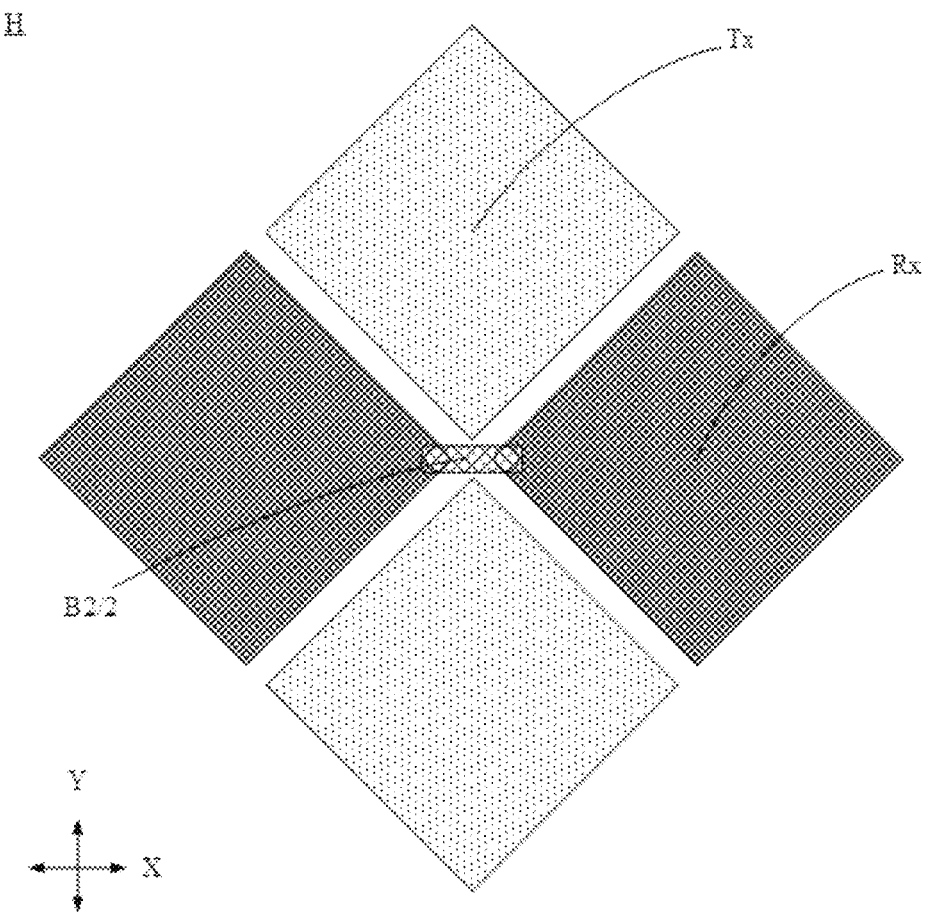
FIG. 18 is an enlarged view of a structure corresponding to a region where the dotted line frame H in FIG. 11 is located.

In an exemplary embodiment, as shown in FIG. 18, the second touch channel 2 further includes a second connection portion B2, and at least one pair of correspondingly arranged second touch electrodes Rx are electrically connected through the second connection portion B2. The second connection portion B2 extends approximatively along the first direction X.

For example, the second touch electrodes Rx may be integrally provided with the second connection portion B2.

For example, at least one second connection portion B2 may be included in the same second touch channel 2, and the second connection portion B2 enables an electrical connection between the multiple second sub-touch channels 2a located in the same second touch channel 2, thereby causing the multiple second sub-touch channels 2a located in the same second touch channel 2 to transmit the same touch signal. By controlling the number of the second connection portions B2, the magnitude of the resistance of the touch structure 10 may be controlled, and the larger the number of the second connection portions B2, the smaller the resistance of the touch structure 10.

In some embodiments, a first touch channel 1 includes multiple first sub-touch channels 1a, and a second touch channel 2 includes multiple second sub-touch channels 2a. For example, referring to FIG. 12, the first touch channel 1 includes two first sub-touch channels 1a, and the second touch channel 2 includes two second sub-touch channels 2a.

Figure 19:
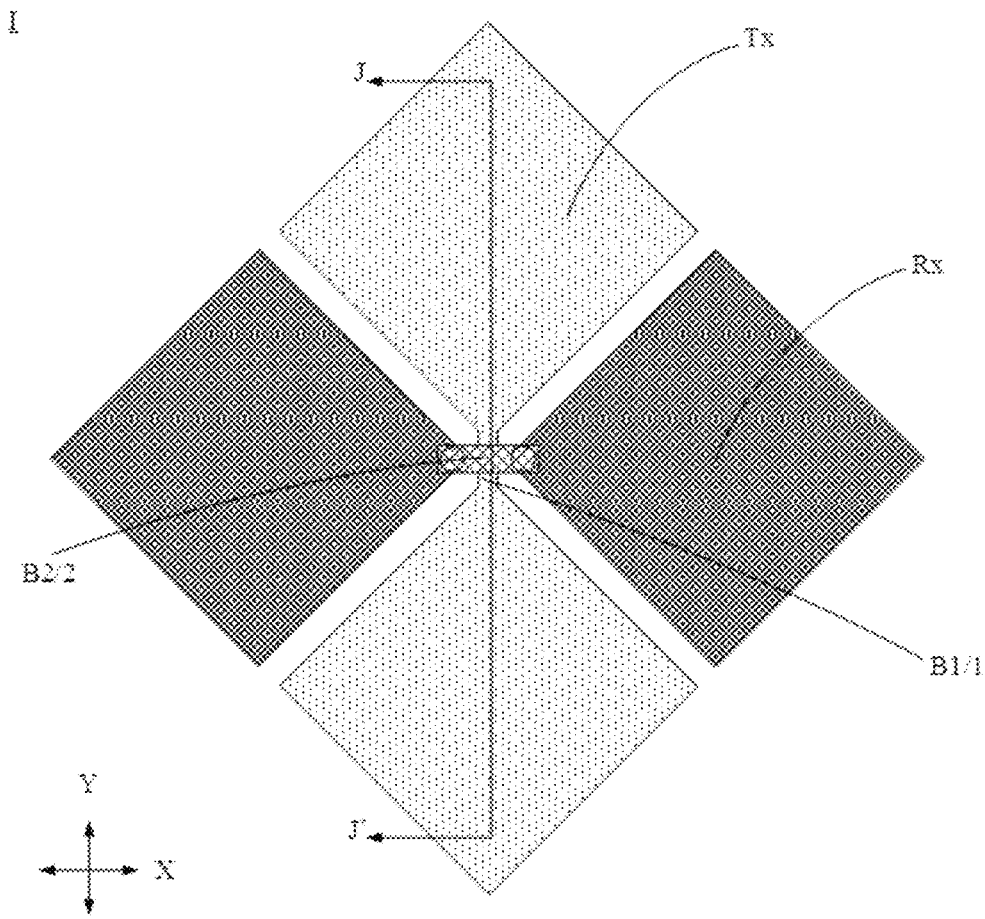
FIG. 19 is an enlarged view of a structure corresponding to a region where the dotted line frame I in FIG. 12 is located.

On this basis, referring to FIG. 19, at least one first connection portion B1 crosses at least one second connection portion B2. The first connection portion B1 and the second connection portion B2 are insulated from each other.

By controlling the number of the first connection portion B1 and the second connection portion B2, the magnitude of the resistance of the touch structure 10 may be controlled. The larger the number of the first connection portion B1 and the second connection portion B2, the smaller the resistance of the touch structure 10.

Figure 20:
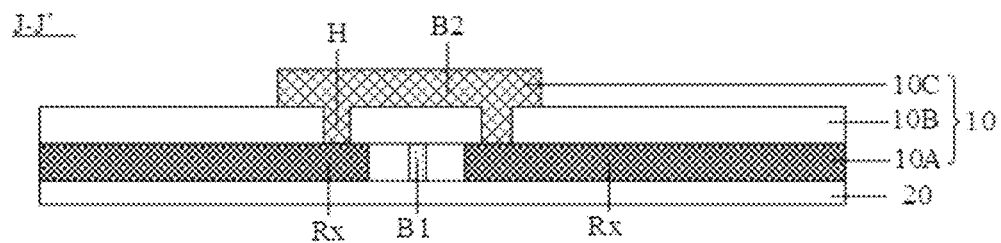
FIG. 20 is a cross-section taken along the section line J-J' in FIG. 19.

In some embodiments, as shown in FIGS. 15 and 20, the touch structure 10 includes a first conductive layer 10A, an insulating layer 10B, and a second conductive layer 10C that are provided in a stack. The insulating layer 10B is located between the first conductive layer 10A and the second conductive layer 10C.

The first touch electrodes Tx and the second touch electrodes Rx are located in the first conductive layer 10A.

In an exemplary embodiment, the first touch channel 1 includes third connection portions B3, and referring to FIG. 14, along the first direction X, any two adjacent first touch electrodes Tx are electrically connected through a third connection portion B3; and the second touch channel 2 includes fourth connection portions B4, and referring to FIG. 14, along the second direction Y, any two adjacent second touch electrodes Rx are electrically connected through a fourth connection portion B4. The third connection portion B3 crosses the fourth connection portion B4.

At a position where the third connection portion B3 crosses the fourth connection portion B4, the insulating layer 10B is utilized to separate the third connection portion B3 from the fourth connection portion B4, so that while electrically connecting the touch electrodes in the same touch channel is realized, a problem of an electrical conduction occurring at the cross position, which results in crosstalk of the touch signals transmitted at the first touch electrode Tx and the second touch electrode Rx, is avoided.

For example, as shown in FIG. 15, the third connection portion B3 is located in the first conductive layer 10A, and the fourth connection portion B4 is located in the second conductive layer 10C.

The third connection portion B3 is integrally provided with the first touch electrodes Tx. Via holes H are provided in the insulating layer 10B, and the fourth connection portion B4 is electrically connected to the second touch electrodes Rx through via holes H.

For example, the third connection portion B3 may be located in the second conductive layer 10C, and accordingly, the fourth connection portion B4 is located in the first conductive layer 10A.

The fourth connection portion B4 is integrally provided with the second touch electrodes Rx. Via holes H are provided in the insulating layer 10B, and the third connection portion B3 is electrically connected to the first touch electrodes Tx through via holes H.

Referring to FIGS. 10, 11, and 12, the number of connection structures each composed of a third connection portion B3 and a fourth connection portion B4 in the touch structure 10 is greater than the number of connection structures in the related art, so that the resistance of the touch structure 10 may be effectively reduced.

In an exemplary embodiment, a first touch channel 1 includes multiple first connection portions B1, and referring to FIG. 19, in the same first touch channel 1, two adjacent first touch electrodes Tx along the second direction Y are electrically connected to each other through a first connection portion B1; and a second touch channel 2 includes multiple second connection portions B2, and referring to FIG. 19, in the same second touch channel 2, two adjacent second touch electrodes Rx along the first direction X are electrically connected to each other through a second connection portion B2.

Referring to FIG. 19, at least one first connection portion B1 crosses at least one second connection portion B2.

At a position where the first connection portion B1 crosses the second connection portion B2, the insulating layer 10B is utilized to separate the first connection portion B1 from the second connection portion B2, so that while electrically connecting the touch electrodes in the same touch channel is realized, a problem of an electrical conduction occurring at the cross position, which results in crosstalk of the touch signals transmitted at the first touch electrode Tx and the second touch electrode Rx, is avoided.

For example, as shown in FIG. 20, the first connection portion B1 is located in the first conductive layer 10A, and the second connection portion B2 is located in the second conductive layer 10C.

The first connection portion B1 is integrally provided with the first touch electrodes Tx. Via holes H are provided in the insulating layer 10B, and the second connection portion B2 is electrically connected to the second touch electrodes Rx through via holes H.

For example, the first connection portion B1 may be located in the second conductive layer 10C, and accordingly, the second connection portion B2 is located in the first conductive layer 10A.

The second connection portion B2 is integrally provided with the second touch electrodes Rx. Via holes H are provided in the insulating layer 10B, and the first connection portion B1 is electrically connected to the first touch electrodes Tx through via holes H.

Referring to FIGS. 10, 11, and 12, the number of connection structures each composed of a first connection portion B1 and a second connection portion B2 in the touch structure 10 is greater than the number of connection structures in the related art, so that the resistance of the touch structure 10 may be effectively reduced.

For example, at a position where there is no crossing between the first connection portion B1 and the second connection portion B2, the first connection portion B1 may be located in any layer of the first conductive layer 10A or the second conductive layer 10C, and the second connection portion B2 may be located in the other layer of the first conductive layer 10A or the second conductive layer 10C.

For example, relative to the second conductive layer 10C, the first conductive layer 10A may be provided closer to the light-emitting substrate, or may be provided farther away from the light-emitting substrate, which is not limited in the embodiments of the present disclosure.

In some embodiments, as shown in FIGS. 10 to 12, both the first touch electrode Tx and the second touch electrode Rx are substantially rhombus-shaped electrodes. That is, the first touch electrode Tx and the second touch electrode Rx are each in a shape of an approximate rhombus.

For example, two diagonal lines of the rhombic touch electrode (including the first touch electrode Tx and the second touch electrode Rx) extend along the first direction X and the second direction Y, respectively.

For example, each of four edges of at least one first touch electrode Tx is adjacent to and parallel to a respective one of edges of four second touch electrodes Rx.

The first touch channel 1 is located in a first rectangular region extending along the first direction X, and the second touch channel 2 is located in a second rectangular region extending along the second direction Y.

It will be noted that, the aforementioned "first rectangular region" is a region where first touch electrodes Tx in a first touch channel 1 are located; specifically, the first rectangular region is a rectangular region with the smallest area that can encompass all the first touch electrodes Tx in the same first touch channel 1; the aforementioned "second rectangular region" is a region where second touch electrodes Rx in a second touch channel 2 are located; specifically, the second rectangular region is a rectangular region with the smallest area that can encompass all the second touch electrodes Rx in the same second touch channel 2.

As shown in FIGS. 10 to 12, a rectangular region in which the first rectangular region and the second rectangular region cross is a touch unit region J.

It will be noted that the touch unit region J is a touch point of the touch structure 10. When a finger touches the touch unit region J, the mutual capacitance value of touch electrodes in the touch unit region J changes, thereby detecting the touch position of the finger, to achieve the touch effect of the touch structure 10.

For example, the touch structure 10 includes a plurality of touch unit regions J distributed in an array along the first direction X and the second direction Y.

For example, each touch unit region J has multiple first touch electrodes Tx transmitting the same touch signal, and each touch unit region J has multiple second touch electrodes Rx transmitting another same touch signal.

In an exemplary embodiment, as shown in FIGS. 10 to 12, the third connection portion B3 and the fourth connection portion B4 cross to form a first connection structure M1. The touch unit region J is provided therein with at least two first connection structures M1.

For example, as shown in FIG. 10, a first touch channel 1 includes two adjacent first sub-touch channels 1a, and a second touch channel 2 includes one second sub-touch channel 2a. The touch unit region J includes two first connection structures M1 arranged along the second direction Y.

For example, as shown in FIG. 11, a first touch channel 1 includes one first sub-touch channel 1a, and a second touch channel 2 includes two adjacent second sub-touch channels 2a. The touch unit region J includes two first connection structures M1 arranged along the first direction X.

For example, as shown in FIG. 12, a first touch channel 1 includes two adjacent first sub-touch channels 1a, and a second touch channel 2 includes two adjacent second sub-touch channels 2a. The touch unit region J includes four first connection structures M1 distributed in an array along the first direction X and the second direction Y.

As shown in FIG. 16, in the related art, only one first connection structure M1' is provided in a touch unit region J' in the touch structure 10'.

The larger the number of the first connection structures M1, the more conductive metals in the touch structure 10, and the smaller the resistance of the touch structure 10 is.

In the touch structure 10 provided in embodiments of the present disclosure, by providing multiple sub-touch channels (including the first sub-touch channel 1a and the second sub-touch channel 2a) in at least one touch channel (including the first touch channel 1 and the second touch channel 2), and providing the same touch channel with two adjacent sub-touch channels electrically connected, a touch unit region J is provided therein with at least two first connection structures M1, thereby increasing the amount of conductive metal in the touch structure 10, reducing the overall resistance of the touch structure 10, and ensuring that after removing some of the metal lines GL and increasing the light transmittance of the touch structure 10, the resistance of the touch structure 10 remains within a range that can satisfy the normal touch function, thereby optimizing the touch effect of the touch structure 10.

In an exemplary embodiment, as shown in FIG. 12, a first touch channel 1 includes two adjacent first sub-touch channels 1a, and a second touch channel 2 includes two adjacent second sub-touch channels 2a. The first touch channel 1 includes first connection portions B1, and the second touch channel 2 includes second connection portions B2. A first connection portion B1 and a second connection portion B2 cross to form a second connection structure M2. The touch unit region J is provided therein with at least one second connection structure M2.

In the touch structure 10 provided by embodiments of the present disclosure, by providing multiple first sub-touch channels 1a in the first touch channel 1, providing multiple second sub-touch channels 2a in the second touch channel 2, and by providing that adjacent and corresponding touch electrodes (first touch electrodes Tx or second touch electrodes Rx) respectively belonging to different sub-touch channels (first sub-touch channels 1a or second sub-touch channels 2a) in the same touch channel (the first touch channel 1 or the second touch channel 2) are electrically connected, a touch unit region J may be provided therein with at least one second connection structure M2, thereby further increasing the amount of conductive metal in the touch structure 10, reducing the overall resistance of the touch structure 10, and ensuring that after removing some of the metal lines GL and increasing the light transmittance of the touch structure 10, the resistance of the touch structure 10 remains within a range that can satisfy the normal touch function, thereby optimizing the touch effect of the touch structure 10.

In some embodiments, as shown in FIGS. 10 to 12, the touch unit region J includes at least one first touch electrode Tx, and/or the touch unit region J includes at least one second touch electrode Rx.

For example, as shown in FIG. 10, the touch unit region J includes one whole second touch electrode Rx, two opposite first connection structures M1 electrically connected to the second touch electrode Rx, and two groups of electrode patterns electrically connected to the two first connection structures M1, respectively. Here, each group of electrode patterns includes a pattern of half of a first touch electrode Tx, a pattern of half of a second touch electrode Rx, and a pattern of half of another first touch electrode Tx that are provided in sequence around a first connection structure M1.

For example, as shown in FIG. 11, the touch unit region J includes one whole first touch electrode Tx, two opposite first connection structures M1 electrically connected to the first touch electrode Tx, and two groups of electrode patterns electrically connected to the two first connection structures M1, respectively. Here, each group of electrode patterns includes a pattern of half of a second touch electrode Rx, a pattern of half of a first touch electrode Tx, and a pattern of half of another second touch electrode Rx that are provided in sequence around a first connection structure M1.

For example, the touch unit region J includes two first touch electrodes Tx located in the same first sub-touch channel 1*a* and arranged adjacent to each other, and two second touch electrodes Rx located in the same second sub-touch channel 2*a* and arranged adjacent to each other. Here, of the two first touch electrodes Tx, each first touch electrode Tx is arranged adjacent to both the two second touch electrodes Rx.

For example, as shown in FIG. 12, the touch unit region J includes one second connection structure M2, and two whole first touch electrodes Tx and two whole second touch electrodes Tx that are arranged around the second connection structure M2, in which the two first touch electrodes Tx are arranged opposite to each other, and the two second touch electrodes Rx are arranged opposite to each other. The touch unit region J further includes four first connection structures M1 arranged around the second connection structure M2, and four groups of electrode patterns electrically connected to the four first connection structures M1, respectively. Here, each group of electrode patterns includes a pattern of half of a first touch electrode Tx, and a pattern of half of a second touch electrode Rx that are provided in sequence around a first connection structure M1.

Areas of the touch electrodes (including the first touch electrodes Tx and the second touch electrodes Rx) in the touch structure 10 provided in some embodiments of the present disclosure (refer to FIG. 6) are each substantially 0.25 times the area of the touch electrode in the related art (refer to FIG. 16), but the area of the touch unit region J (refer to FIG. 6) is substantially equal to the area of the touch unit region J' in the related art (refer to FIG. 16). That is, in the touch structure 10 provided by some embodiments of the present disclosure, although the size of the touch electrodes is reduced due to increasing the number of connection structures (including the first connection structures M1 and the second connection structures M2), the size and number of the touch unit regions J in the touch structure 10 remain substantially unchanged. That is, the number of the touch points of the touch structure 10 remain unchanged. Therefore, the embodiments provided by the present disclosure may reduce the resistance of the touch structure 10, improve the touch sensitivity, and optimize the touch effect while substantially maintaining the original distribution of the touch points.

Figure 21:
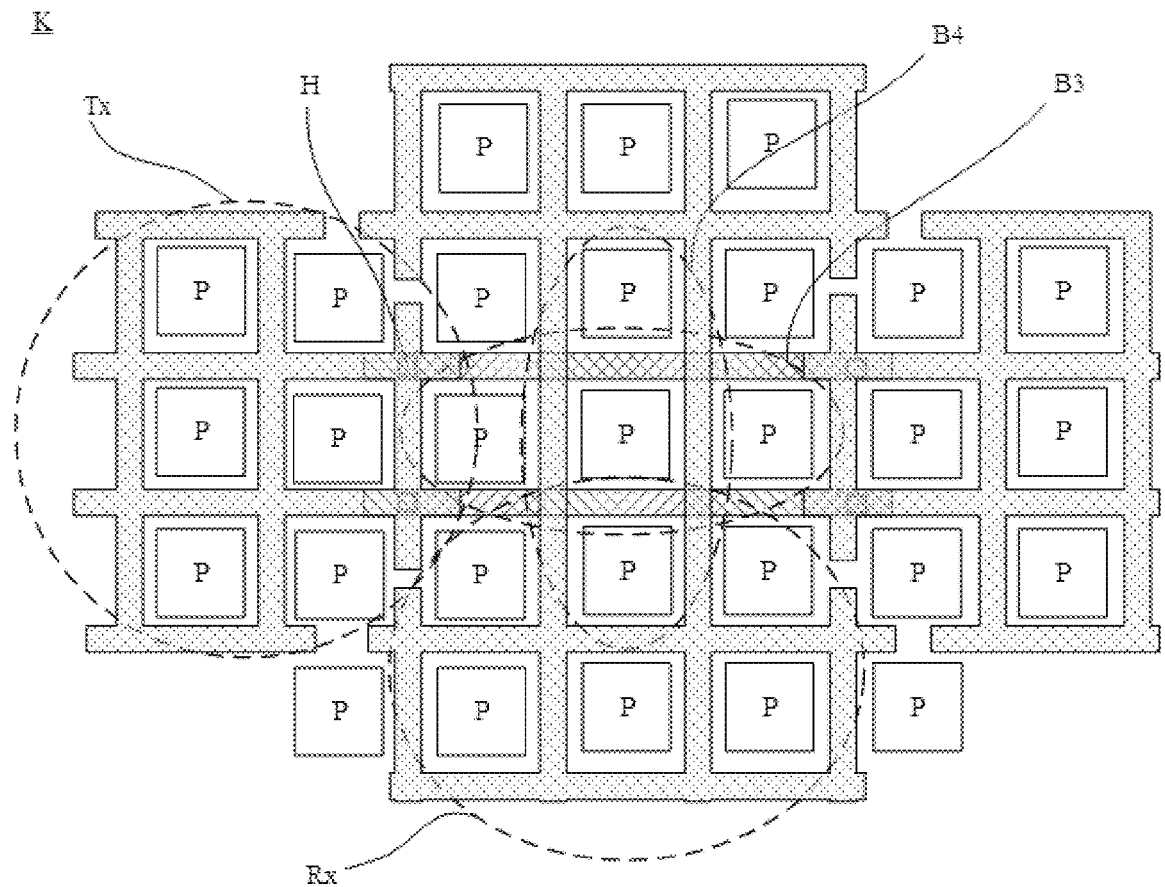
FIG. 21 is an enlarged view of a structure corresponding to a region where the dotted line frame K in FIG. 14 is located.

In some embodiments, as shown in FIG. 21, the first touch electrode Tx, the second touch electrode Rx, the third connection portion B3 and the fourth connection portion B4 are each of a metal grid square structure (i.e., including multiple metal grid squares G). In a case where the first touch channel 1 includes the first connection portion B1, and/or the second touch channel 2 includes the second connection portion B2, the first connection portion B1 and/or the second connection portion B2 are each of a metal grid square structure.

That is, the first touch electrode Tx, the second touch electrode Rx, the first connection portion B1, the second connection portion B2, the third connection portion B3 and the fourth connection portion B4 may each include multiple metal lines GL, and the multiple metal lines GL cross each other to form metal grid squares G. Therefore, while ensuring smooth conduction of the touch signal, the light transmittance of the touch structure 10 may be increased through the metal grid squares G, thereby improving the display effect of the display apparatus 1000.

Figure 22:
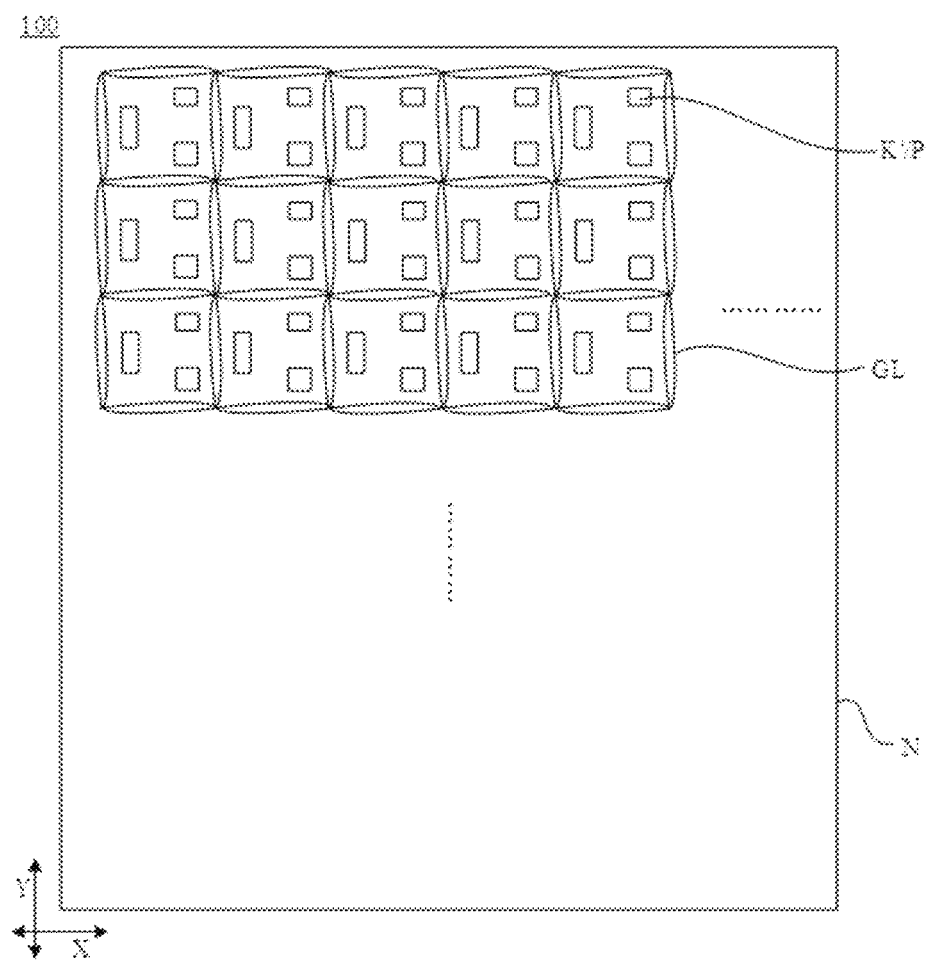
FIG. 22 is yet another top view of a touch display structure, in accordance with some embodiments.

In some embodiments, as shown in FIG. 22, multiple metal lines GL are provided correspondingly between light-emitting regions K' of at least one pair of adjacent sub-pixels P, and the multiple metal lines GL are electrically connected to each other.

For example, as shown in FIG. 22, two metal lines GL are provided correspondingly between light-emitting regions K' of adjacent sub-pixels P, and the two metal lines GL are electrically connected to each other. That is, the metal lines GL forming the metal grid squares G are arranged in a winding manner. Through the winding design, the number of metal lines GL can be further increased without affecting the light-emitting effect of the light-emitting substrate 20, thereby reducing the resistance of the touch structure 10 to optimize the touch effect.

Figure 23:
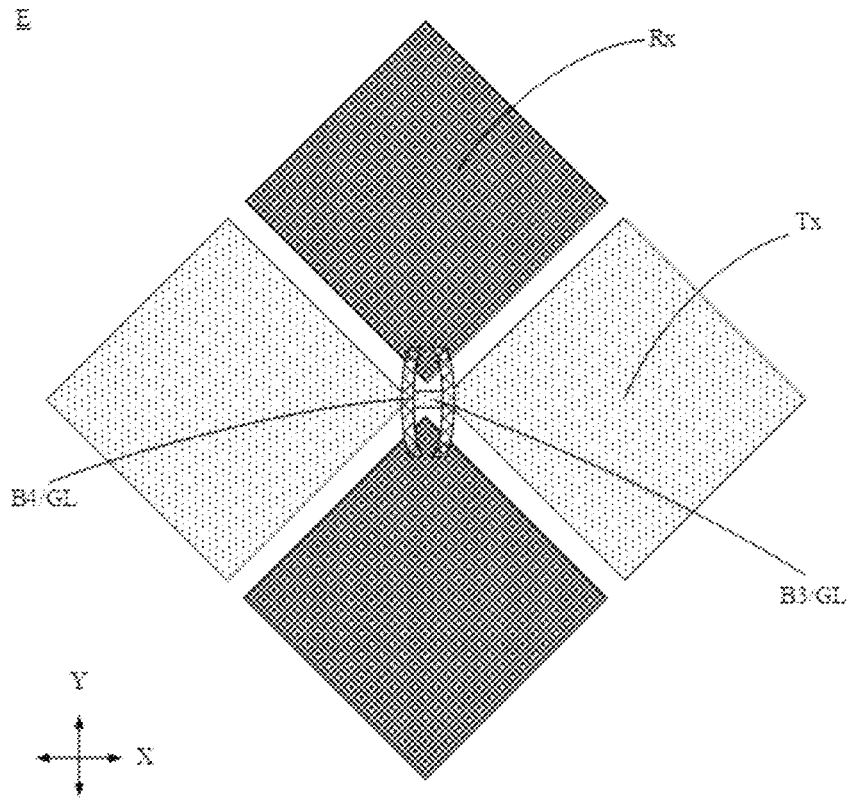
FIG. 23 is another enlarged view of a structure corresponding to a region where the dotted line frame E in FIG. 10 is located.

For example, as shown in FIG. 23, at least one of the first connection portion B1, the second connection portion B2, the third connection portion B3 and the fourth connection portion B4 may be arranged in the winding manner to arrange the metal lines GL, and may further increase the number of metal lines GL to reduce the resistance of the touch structure 10 and optimize the touch effect.

Figure 24:
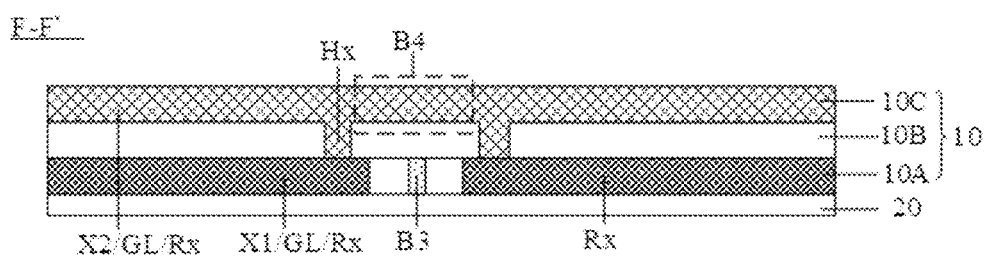
FIG. 24 is a cross-section taken along the section line F-F' in FIG. 14.

In some embodiments, as shown in FIG. 24, the metal lines GL of at least one of the first touch electrode Tx, the second touch electrode Rx, the first connection portion B1, the second connection portion B2, the third connection portion B3 and the fourth connection portion B4 may adopt a double-layer structure.

For example, referring to FIG. 24, the first touch electrode Tx and the second touch electrode Rx each adopt a double-layer structure. That is, the first touch electrode Tx and the second touch electrode Rx both include a first conductive line X1 and a second conductive line. Line X2, in which the first conductive line X1 and the second conductive line X2 are respectively provided in the first conductive layer 10A and the second conductive layer 10C, the first conductive line X1 overlaps with the second conductive line X2, and the first conductive line X1 and the second conductive line X2 are electrically connected to each other through via holes Hx through the insulating layer 10B.

By providing a double-layer structure of metal lines GL, the number of metal lines GL can be further increased, thereby reducing the resistance of the touch structure 10 and optimizing the touch effect.

Based on the foregoing various embodiments, the light transmittance of the touch structure 10 can be improved through different distribution methods of the metal grid squares G.

In some embodiments, the light-emitting substrate 20 includes a plurality of pixel units S, and each pixel unit S includes multiple sub-pixels P capable of emitting light of different colors.

Figure 25:
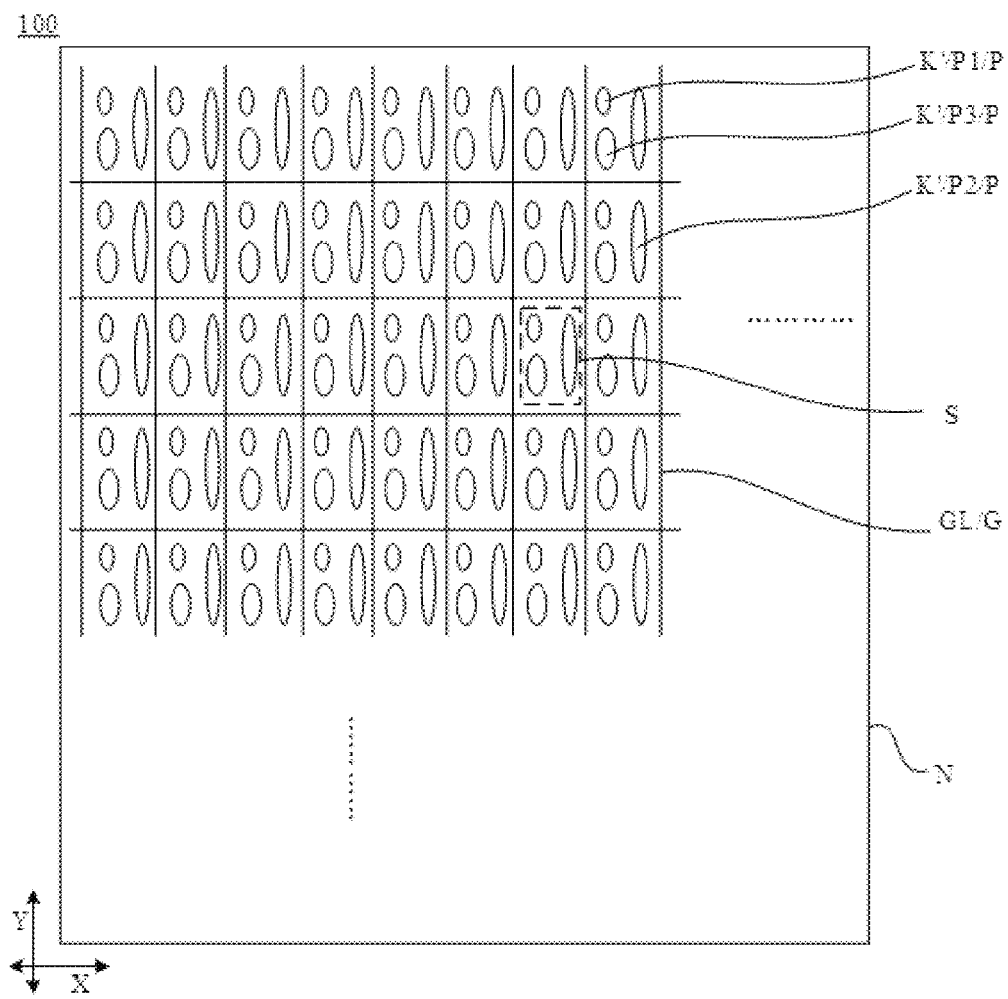
FIG. 25 is yet another top view of a touch display structure, in accordance with some embodiments.
Figure 26:
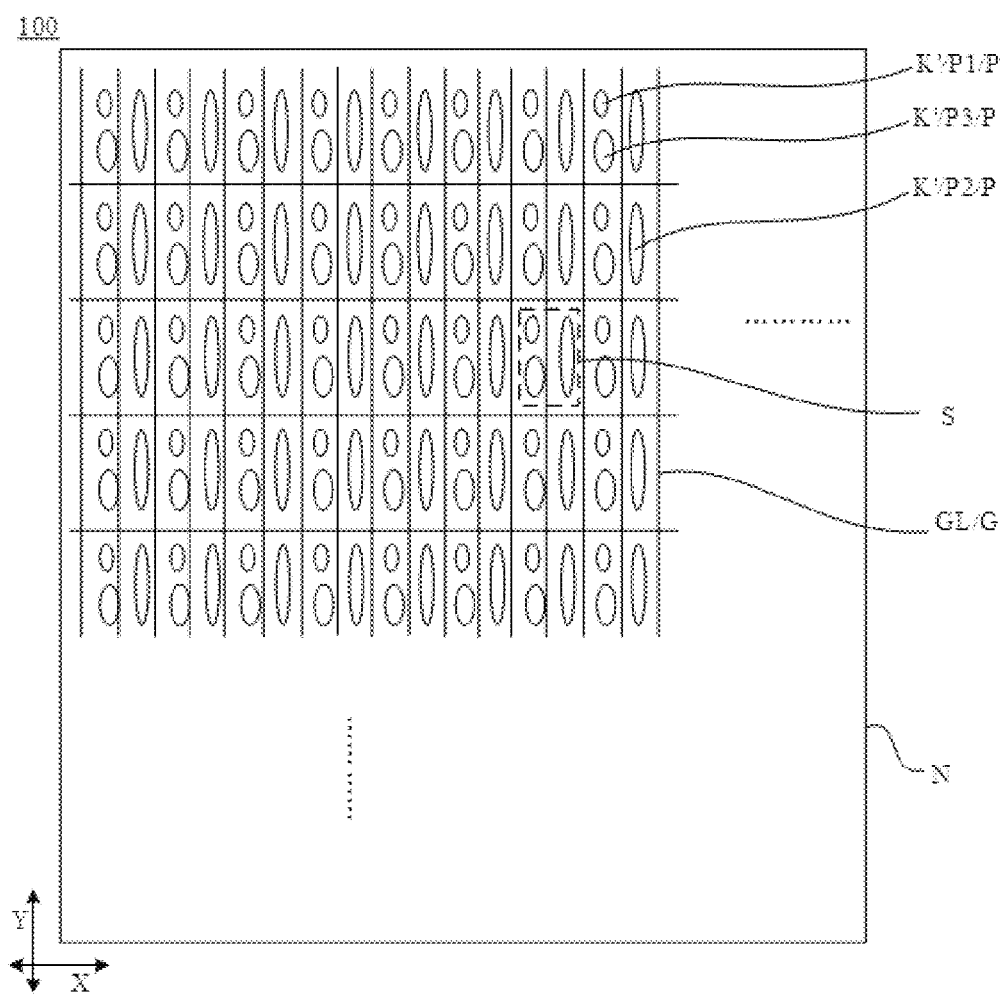
FIG. 26 is yet another top view of a touch display structure, in accordance with some embodiments.

For example, as shown in FIGS. 2, 25, and 26, a pixel unit S includes one first sub-pixel P1, one second sub-pixel P2, and one third sub-pixel P3. The plurality of pixel units S are distributed in an array along the first direction X and the second direction Y.

Figure 27:
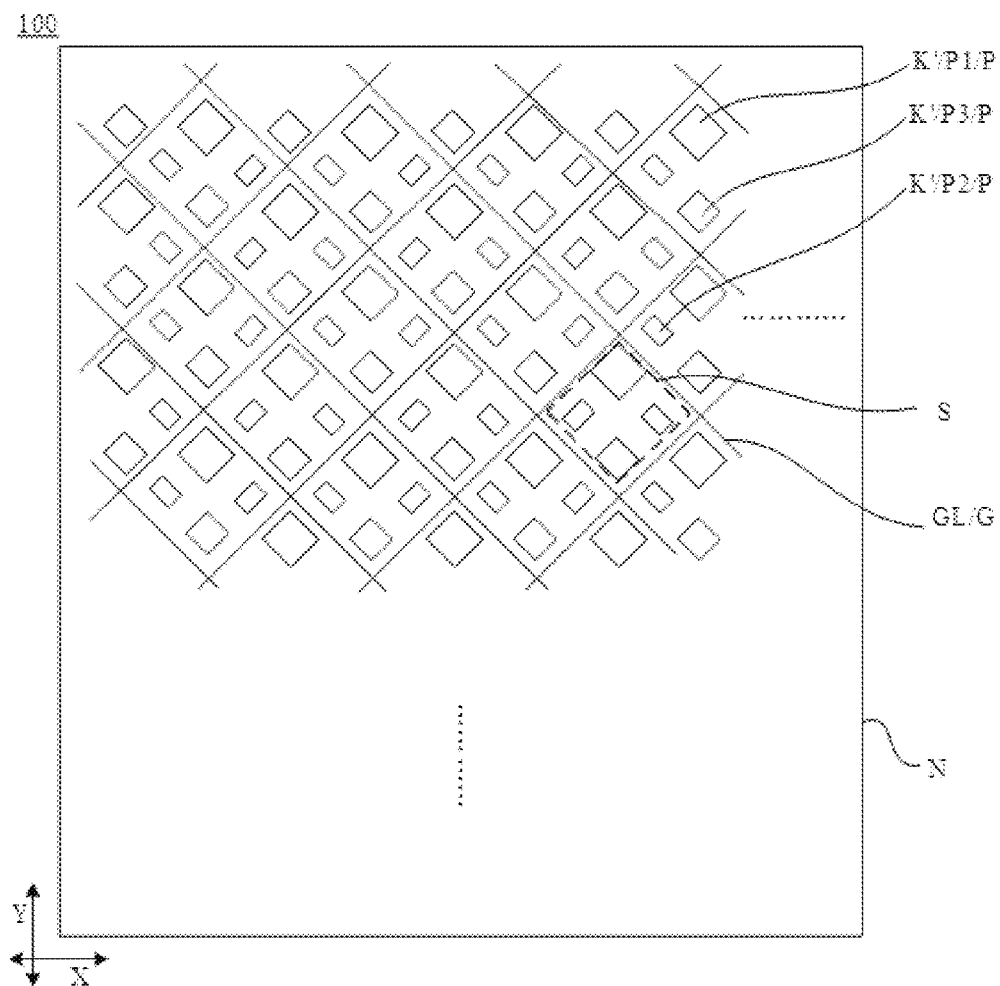
FIG. 27 is yet another top view of a touch display structure, in accordance with some embodiments.

For example, as shown in FIGS. 3 and 27, a pixel unit S includes one first sub-pixel P1, two second sub-pixels P2, and one third sub-pixel P3, in which the two second sub-pixels P2 are arranged in sequence along the first direction X, and the two second sub-pixels P2 are arranged on both sides of a line connecting the first sub-pixel P1 and the third sub-pixel P3. The plurality of pixel units S are distributed in an array along a direction parallel to a diagonal line of the light-emitting substrate 20.

Figure 28:
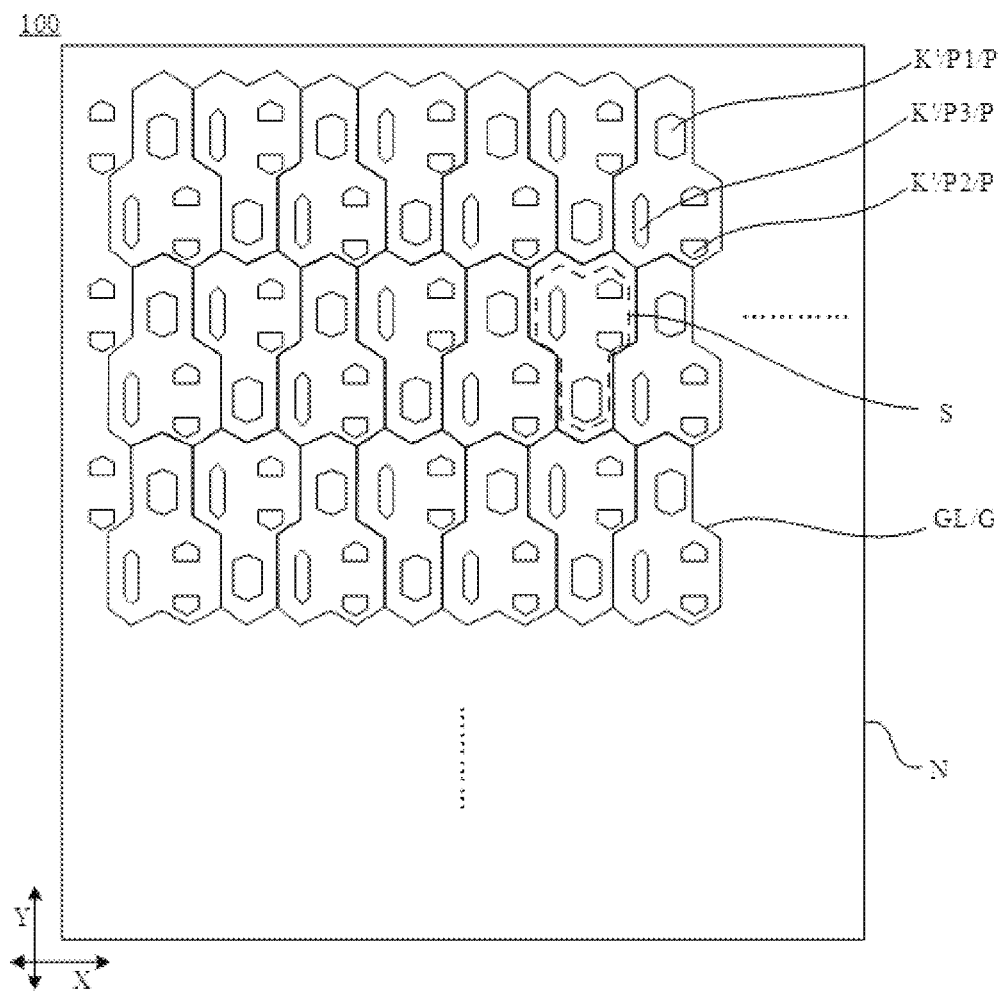
FIG. 28 is yet another top view of a touch display structure, in accordance with some embodiments.

For example, as shown in FIGS. 4 and 28, a pixel unit S includes one first sub-pixel P1, two second sub-pixels P2, and one third sub-pixel P3, in which the two second sub-pixels P2 are arranged in sequence along the second direction Y.

On the basis of the aforementioned various modes of distribution of the pixel units S, orthographic projections of light-emitting regions K' of multiple sub-pixels P of the pixel unit S on the reference surface N are located within a range of an orthographic projection of at least one metal grid square G on the reference surface N. And, orthographic projections of light-emitting regions K' of at least two of the multiple sub-pixels P on the reference surface N are located within a range of an orthographic projection of the same metal grid square G on the reference surface N.

That is, a pixel unit S may correspond to at least one metal grid square G, and one metal grid square G in the at least one metal grid square G corresponds to at least two sub-pixels P.

By providing one pixel unit S corresponding to at least one metal grid square G, and, and one metal grid square G of the at least one metal grid square G corresponds to at least two sub-pixels P, it can be ensured that a metal grid square G can allow light emitted from the at least two sub-pixels P to be directed therethrough. In this way, compared to the situation in the related art in which one metal grid square G' corresponds to one sub-pixel P', since the area of the metal grid square G of the touch structure 10 in the touch display structure 100 provided in the embodiments of the present disclosure is larger, the light transmittance of the touch structure 10 is higher, which can improve the display effect of the touch display structure 100, and the resistance of the touch structure 10 is smaller, which can simultaneously satisfy the light transmission effect and the touch effect.

For example, in a case where a pixel unit S includes one sub-pixel P capable of emitting red light, one sub-pixel P capable of emitting blue light and one sub-pixel P capable of emitting green light, orthographic projections of light-emitting regions K' of all sub-pixels P of the pixel unit S on the reference surface N are located within a range of an orthographic projection of the same metal grid square G on the reference surface N.

For example, referring to FIG. 25, multiple sub-pixels P are arranged in Real RGB. Orthographic projections of light-emitting regions K' of all sub-pixels P of a pixel unit S on the reference surface N are located within a range of an orthographic projection of the same metal grid square G on the reference surface N.

That is, one metal grid square G may be provided therein with three sub-pixels P, ensuring that one metal grid square G can allow light emitted from three sub-pixels P to be directed therethrough. Compared to the situation in the related art in which one metal grid square G' corresponds to one sub-pixel P', since the area of the metal grid square G of the touch structure 10 in the touch display structure 100 provided in the embodiments of the present disclosure is larger, the light transmittance of the touch structure 10 is higher, which can improve the display effect of the touch display structure 100.

For example, in a case where a pixel unit S includes one sub-pixel P capable of emitting red light, one sub-pixel P capable of emitting blue light and one sub-pixel P capable of emitting green light, an orthographic projection of a light-emitting region K' of the sub-pixel P capable of emitting red light on the reference surface N is located within a range of an orthographic projection of a metal grid square G on the reference surface N, and an orthographic projection of a light-emitting region K' of the sub-pixel P capable of emitting blue light and an orthographic projection of alight-emitting region K' of the sub-pixel P capable of emitting green light on the reference surface N are both located within a range of an orthographic projection of another metal grid square G on the reference surface N.

For example, referring to FIG. 26, multiple sub-pixels P are arranged in Real RGB. Orthographic projections of light-emitting regions K' of multiple sub-pixels P of a pixel unit S on the reference surface N are located within a range of orthographic projections of two metal grid squares G on the reference surface N. For the multiple sub-pixels P of the pixel unit S, orthographic projections of a light-emitting region K' of a first sub-pixel P1 and a light-emitting region K' of a third sub-pixel P3 on the reference surface N are located within a range of an orthographic projection of the same metal grid square G on the reference surface N, and an orthographic projection of a light-emitting region K' of a second sub-pixel P2 on the reference surface N is located within a range of an orthographic projection of another metal grid square G on the reference surface N.

That is, for two metal grid squares G corresponding to one pixel unit S, one of the metal grid squares G is provided therein with one sub-pixel P (e.g., the second sub-pixel P2), and the other of the metal grid squares G is provided therein with two sub-pixels P (e.g., the first sub-pixel P1 and the third sub-pixel P3). It can be ensured that at least one metal grid square G can allow light emitted from two sub-pixels P to be directed therethrough. Compared to the situation in the related art in which one metal grid square G' corresponds to one sub-pixel P', since the area of the metal grid square G of the touch structure 10 in the touch display structure 100 provided in the embodiments of the present disclosure is larger, the light transmittance of the touch structure 10 is higher, which can improve the display effect of the touch display structure 100.

The inventors of the present disclosure have performed a simulation analysis of the touch structure 10 provided by embodiments of the present disclosure, and the results of the analysis are as follows:

In a case where each metal grid square G corresponds to one sub-pixel P, the aperture ratio of the touch structure 10 is about 10.8%, or the proportion of the metal lines GL is about 10% to 20%.

In a case where one metal grid square G corresponds to two sub-pixels P, in which one of the metal grid squares G is provided therein with one sub-pixel P, and the other of the metal grid squares G is provided therein with two sub-pixels P, the aperture ratio of the touch structure 10 is about 15.5%, or the proportion of the metal lines GL is about 10% to 15%.

In a case where one metal grid square G corresponds to three sub-pixels P, the aperture ratio of the touch structure 10 is about 19.2%, or the proportion of the metal lines GL is about 5% to 15%.

In a case where one metal grid square G corresponds to more than three sub-pixels P, the proportion of the metal lines GL is about 0% to 5%.

Here "aperture ratio of the touch structure 10" is a ratio of the area of the metal grid squares G to the overall area of the touch structure 10.

Based on the above analysis results, it can be seen that by arranging one metal grid square G corresponding to at least two sub-pixels P, it is possible to cause the light transmittance of the touch structure 10 to be significantly improved, and effectively improve the display effect of the touch display structure 100.

On this basis, in order to more intuitively present the optimization of the display effect of the aforementioned touch structure 10 on the touch display structure 100, the inventors of the present disclosure have performed a simulation analysis of the touch display structure 100, and in this simulation analysis, in addition to the difference in the aperture rate of the touch structure 10, the conditions of the material, model, and stacking structure of the other structures, such as polarizer, optical adhesive, or glass cover, of the touch display structure 100 are the same. The results of the analysis are described below.

In the case where each metal grid square G corresponds to one sub-pixel P, the screen light transmittance of the touch display structure 100 is about 2.0%.

In the case where one metal grid square G corresponds to two sub-pixels P, in which one of the metal grid squares G is provided therein with one sub-pixel P, and the other of the metal grid squares G is provided therein with two sub-pixels P, the screen light transmittance of the touch display structure 100 is about 2.9%.

In the case where one metal grid square G corresponds to three sub-pixels P, the screen light transmittance of the touch display structure 100 is about 3.6%.

Based on the above analysis results, it can be seen that by arranging one metal grid square G corresponding to at least two sub-pixels P, the screen light transmittance of the touch display structure 100 is effectively improved, thereby optimizing the display effect of the touch display structure 100.

For example, in a case where a pixel unit S includes one sub-pixel P capable of emitting red light, one sub-pixel P capable of emitting blue light and two sub-pixels P capable of emitting green light, orthographic projections of light-emitting regions K' of all sub-pixels P of the pixel unit S on the reference surface N are located within a range of an orthographic projection of the same metal grid square G on the reference surface N.

For example, referring to FIGS. 27 and 28, multiple sub-pixels P are arranged in the diamond-shape or GGRB. Orthographic projections of light-emitting regions K' of multiple sub-pixels P of a pixel unit S on the reference surface N are located within a range of an orthographic projection of the same metal grid square G on the reference surface N.

That is, a metal grid square G can be provided correspondingly therein with four sub-pixels P, ensuring that one metal grid square G can allow light emitted from four sub-pixels P to be directed therethrough. Compared to the situation in the related art in which one metal grid square G' corresponds to one sub-pixel P', since the area of the metal grid square G of the touch structure 10 in the touch display structure 100 provided in the embodiments of the present disclosure is larger, the light transmittance of the touch structure 10 is higher, which can improve the display effect of the touch display structure 100.

Figure 29:
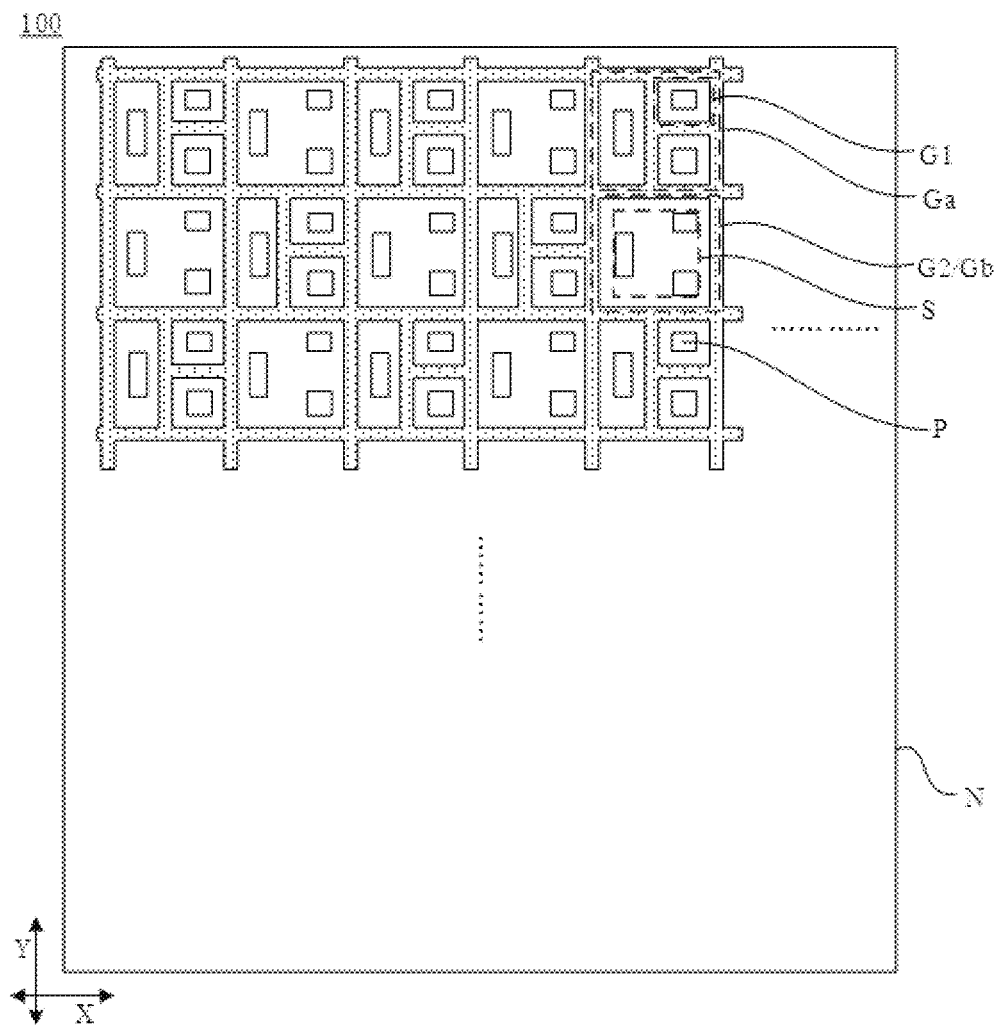
FIG. 29 is yet another top view of a touch display structure, in accordance with some embodiments.

In some embodiments, as shown in FIG. 29, the plurality of metal grid squares G include a plurality of first sub-grid square groups Ga and a plurality of second sub-grid square groups Gb, in which the first sub-grid square groups Ga and the second sub-grid square groups are Gb alternately arranged. A first sub-grid square group Ga includes at least one first sub-grid square G1, and a second sub-grid square Gb includes at least one second sub-grid square G2.

Here, orthographic projections of light-emitting region K' of some of multiple sub-pixels P of a pixel unit S on the reference surface N are located within a range of an orthographic projection of the same first sub-grid square G1 on the reference surface N; and orthographic projections of light-emitting regions K' of all sub-pixels P of another pixel unit S on the reference surface N are located within a range of an orthographic projection of the same second sub-grid square G2 on the reference surface N.

For example, as shown in FIG. 29, multiple sub-pixels P may be arranged in Real RGB.

The first sub-grid square groups Ga and the second sub-grid square groups are Gb alternately arranged along the first direction X and the second direction Y. The first sub-grid square group Ga includes three first sub-grid squares G1, and the second sub-grid square group Gb includes one second sub-grid square G2.

Three first sub-grid squares G1 in the same first sub-grid square group Ga are all arranged in one-to-one correspondence with light-emitting regions K' of three sub-pixels P in the same pixel unit S, respectively; and a second sub-grid square G2 is provided corresponding to light-emitting regions K' of all sub-pixels P in another pixel unit S.

Figure 30:
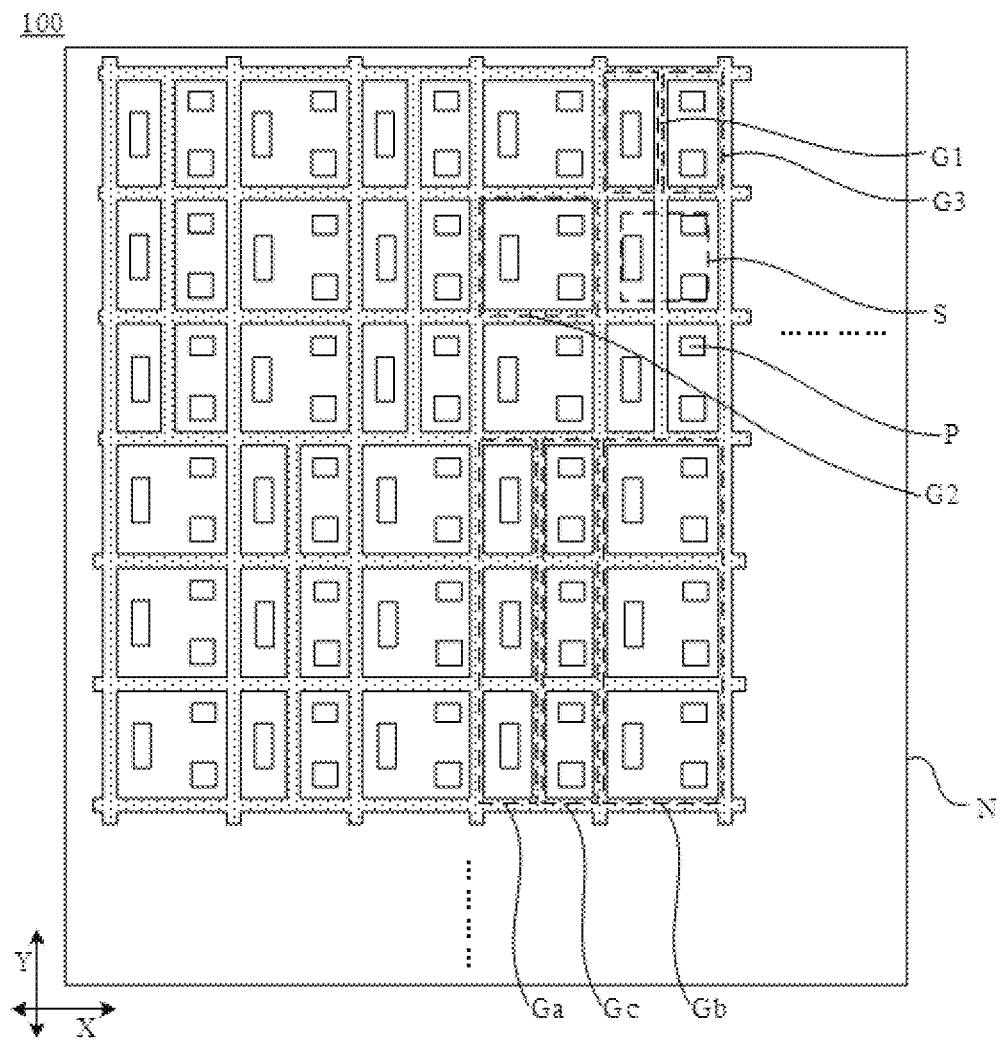
FIG. 30 is yet another top view of a touch display structure, in accordance with some embodiments.

For example, as shown in FIG. 30, the plurality of metal grid squares G further include a plurality of third sub-grid square groups Gc. The first sub-grid square groups Ga, the third sub-grid square groups Gc and the second sub-grid square groups Gb are arranged alternately. A third sub-grid square group Gc includes at least one third sub-grid square G3.

Orthographic projections of light-emitting regions K' of some of multiple sub-pixels P of a pixel unit S on the reference surface N are located within a range of an orthographic projection of the same first sub-grid square G1 on the reference surface; and orthographic projections of light-emitting regions K' of another some of the multiple sub-pixels P of the pixel unit S (except for the aforementioned some of the sub-pixels P) on the reference surface N are located within a range of an orthographic projection of the same third sub-grid square G3 on the reference surface N. Orthographic projections of light-emitting regions K' of all sub-pixels P of another pixel unit S on the reference surface N are located within a range of an orthographic projection of the same second sub-grid square G2 on the reference surface N.

For example, as shown in FIG. 30, multiple sub-pixels P may be arranged in Real RGB.

The first sub-grid square groups Ga, the third sub-grid square groups Gc and the second sub-grid square groups Gb are alternately arranged along the first direction X and the second direction Y. The first sub-grid square group Ga includes three first sub-grid squares G1, and the three first sub-grid squares G1 are arranged in sequence along the second direction Y. The third sub-grid square group Gc includes three third sub-grid squares G3, and the three third sub-grid squares G3 are arranged in sequence along the second direction Y. The second sub-grid square group Gb includes three second sub-grid squares G2, and the three second sub-grid squares G2 are arranged in sequence along the second direction Y.

Among three sub-pixels P of the same pixel unit S, a light-emitting region K' of one sub-pixel P is arranged corresponding to one first sub-grid square G1, and light-emitting regions K' of the other two sub-pixels P are both arranged corresponding to one third sub-grid square G3. Light-emitting regions K' of all sub-pixels P in another pixel unit S are arranged corresponding to one second sub-grid square G2.

By arranging the first sub-grid square groups Ga and the second sub-grid square groups Gb alternately, or arranging the first sub-grid square groups Ga, the third sub-grid square groups Gc and the second sub-grid square groups Gb alternately, the density of distribution of the metal lines GL at different positions may be flexibly controlled, so that it is possible to adaptively reduce the density of distribution of the metal lines GL at the position where the demand of light transmittance is high, allowing for more flexibility in the design.

For example, in a case where touch display structure 100 is provided with an optical fingerprint sensor, more second sub-grid squares G2 can be provided at a position where the optical fingerprint sensor corresponds to the touch structure 10, thereby increasing the light transmittance of the touch structure 10 at this position and optimizing the sensing sensitivity of the optical fingerprint sensor.

Based on the foregoing embodiments, in a case of a variety of design modes and combinations thereof, in which one sub-pixel P is arranged corresponding to one metal grid square G, two sub-pixels P are arranged corresponding to one metal grid square G, three sub-pixels P are arranged corresponding to one metal grid square G, or more than three sub-pixels P are arranged corresponding to one metal grid square G, the proportion of the metal lines GL of the touch structure 10 is about 0% to 20%.

In some embodiments, the light transmittance of the touch structure 10 may also be increased by reducing the width of the metal line GL and expanding the area of the metal grid square G.

In some embodiments, as shown in FIGS. 22, 23 and 24, the metal line GL may extend along a straight line.

In some embodiments, as shown in FIG. 25, the metal line GL may extend in a folded line.

In some embodiments, as shown in FIGS. 22, 23, and 24, the metal grid square G may be in a shape of a regular rectangle.

In some embodiments, as shown in FIG. 25, the metal grid square G may also be in a shape of a polygon.

In some embodiments, as shown in FIGS. 22 to 25, a metal line GL extends along a boundary of a light-emitting region K' of a sub-pixel P, and the metal line GL is located between light-emitting regions K' of adjacent sub-pixels P, so that a metal grid square G corresponds to the light-emitting region K' of the sub-pixel P, to avoid blocking a light-emitting path of the sub-pixel P by the metal line GL, and to increase the efficiency of the light-emitting light of the sub-pixel P, so as to enhance the display effect of the touch display structure 100.

Figure 31:
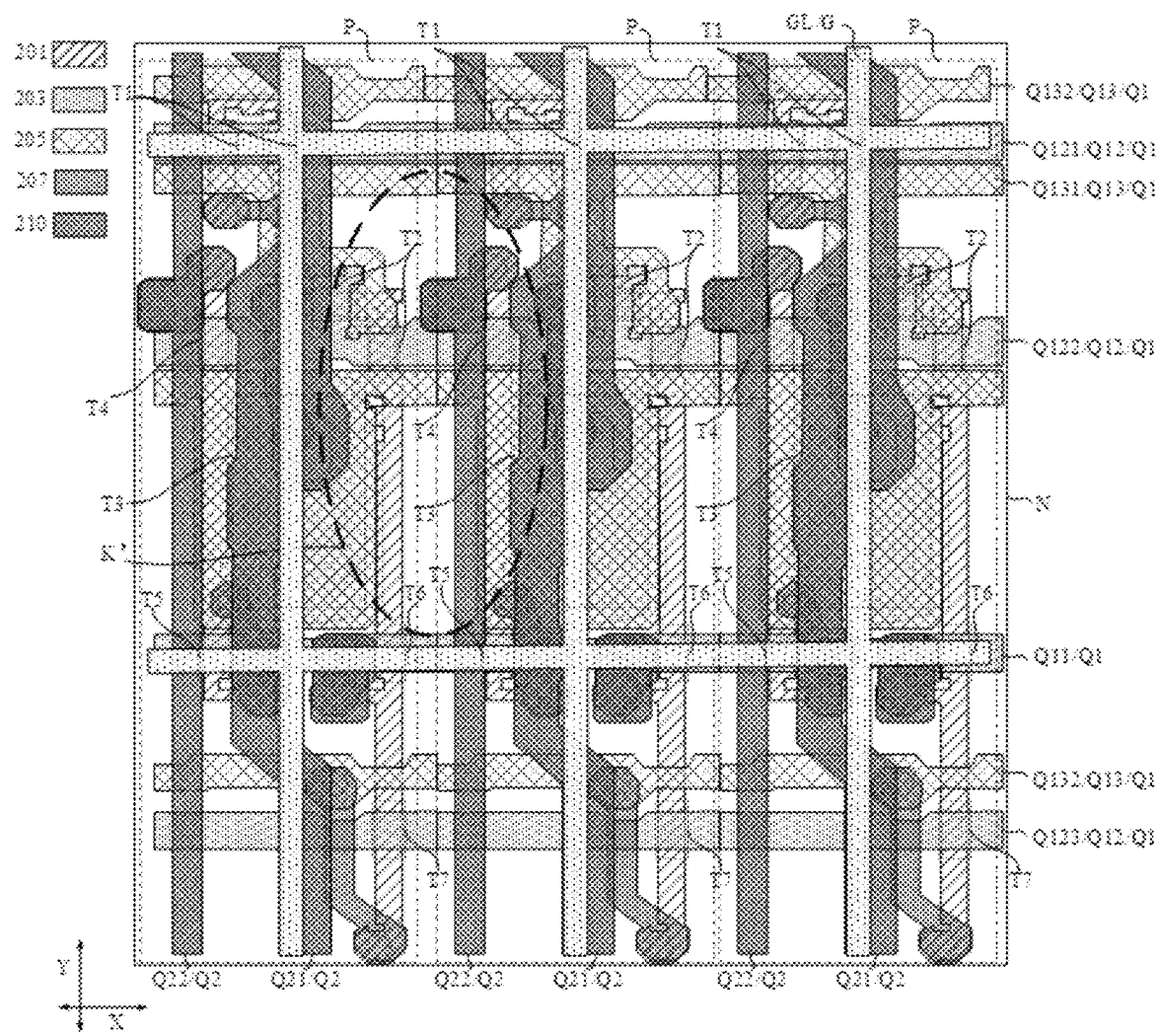
FIG. 31 is yet another top view of a touch display structure, in accordance with some embodiments.

In some embodiments, as shown in FIG. 31, the light-emitting substrate 20 includes a plurality of first signal lines Q1 extending along the first direction X. An orthographic projection of a metal line GL on the reference surface N at least partially overlaps with an orthographic projection of at least one first signal line Q1 on the reference surface N.

For example, the orthographic projection of the metal line GL on the reference surface N overlaps more than 50% with the orthographic projection of the at least one first signal line Q1 on the reference surface N.

In some embodiments, referring to FIG. 5, the light-emitting substrate 20 includes a substrate 21, an active layer 201, a first gate insulating layer 202, a first gate conductive layer 203, a second gate insulating layer 204, a second gate conductive layer 205, an interlayer dielectric layer 206, a first source-drain conductive layer 207, a passivation layer 208, a first planarization layer 209, and a second source-drain conductive layer 210, which are arranged in a sequence of layers.

Figure 32:
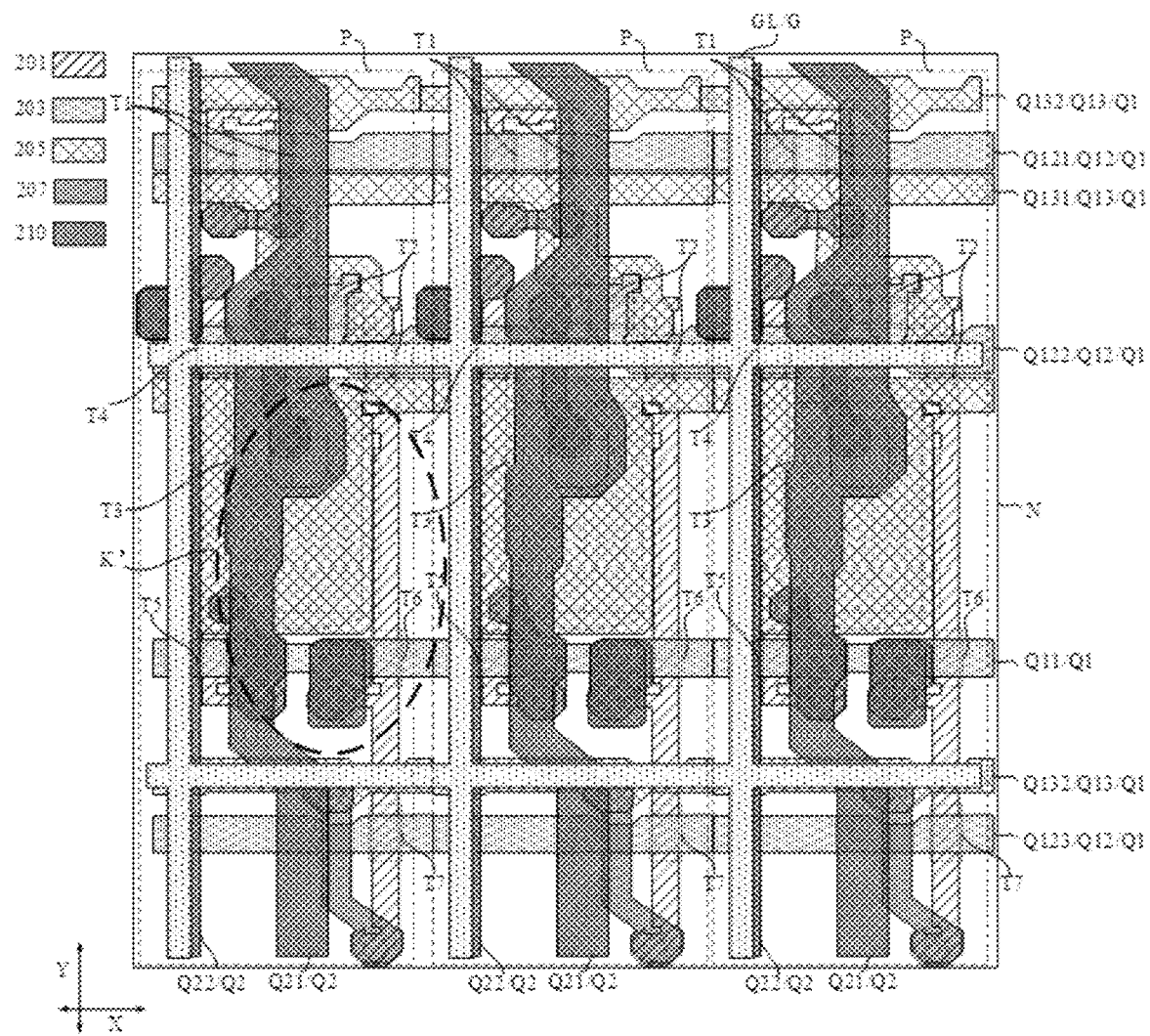
FIG. 32 is yet another top view of a touch display structure, in accordance with some embodiments.

Referring to FIGS. 31 and 32, multiple thin film transistor TFTs may be formed in each sub-pixel P by etching and stacking the patterns in the aforementioned multiple film layers layer by layer. For example, referring to FIGS. 31 and 32, a first transistor T1, a second transistor T2, a third transistor T3, a fourth transistor T4, a fifth transistor T5, a sixth transistor T6, and a seventh transistor T7 may be formed in one sub-pixel P.

The first signal lines Q1 may be arranged in at least one of the first gate conductive layer 203 or the second gate conductive layer 205.

For example, as shown in FIG. 31, the aforementioned plurality of first signal lines Q1 may include enable signal lines Q11. An orthographic projection of a metal line GL on the reference surface N at least partially overlaps with an orthographic projection of at least one enable signal line Q11 on the reference surface N.

Referring to FIG. 31, the enable signal line Q11 is arranged in the first gate conductive layer 203. A portion of the enable signal line Q11 overlapping with the active layer 201 forms a gate electrode of the fifth transistor T5 and a gate electrode of the sixth transistor T6, thereby providing an enable signal to the fifth transistor T5 and the sixth transistor T6.

For example, as shown in FIG. 31, the aforementioned plurality of first signal lines Q1 may further include scanning signal lines Q12. An orthographic projection of a metal line GL on the reference surface N at least partially overlaps with an orthographic projection of at least one scanning signal line Q12 on the reference surface N.

Referring to FIG. 31, the scanning signal lines Q12 are arranged in the first gate conductive layer 203.

As shown in FIG. 31, optionally, the scanning signal lines Q12 may include first scanning signal lines Q121, second scanning signal lines Q122, and third scanning signal lines Q123.

A portion of a first scanning signal line Q121 overlapping with the active layer 201 forms a gate electrode of the first transistor T1, thereby providing a reset signal to the first transistor T1.

A portion of a second scanning signal line Q122 overlapping with the active layer 201 forms a gate electrode of the second transistor T2 and a gate electrode of the fourth transistor T4, thereby providing a first scan signal to the second transistor T2 and the fourth transistor T4.

A portion of a third scanning signal line Q123 overlapping with the active layer 201 forms a gate electrode of the seventh transistor T7, thereby providing a second scan signal to the seventh transistor T7.

The orthographic projection of the metal line GL on the reference surface N may at least partially overlap with an orthographic projection of at least one of the first scanning signal line Q121, the second scanning signal line Q122 or the third scanning signal line Q123 on the reference surface N. For example, referring to FIG. 31, the orthographic projection of the metal line GL on the reference surface N at least partially overlaps with the orthographic projection of the first scanning signal line Q121 on the reference surface N.

For example, as shown in FIG. 32, the aforementioned plurality of first signal lines Q1 may further include initialization signal lines Q13. An orthographic projection of a metal line GL on the reference surface N at least partially overlaps with an orthographic projection of at least one initialization signal line Q13 on the reference surface N.

Referring to FIG. 32, the initialization signal lines Q13 are arranged in the second gate conductive layer 205.

As shown in FIG. 32, optionally, the initialization signal lines Q13 may include first initialization signal lines Q131 and second initialization signal lines Q132.

Here, a first initialization signal line Q131 is electrically connected to the first transistor T1 and configured to provide a first initialization signal to the first transistor T1.

A second initialization signal line Q132 is electrically connected to the seventh transistor T7 and configured to provide a second initialization signal to the seventh transistor T7.

The orthographic projection of the metal line GL on the reference surface N may at least partially overlap with an orthographic projection of at least one of the first initialization signal line Q131 or the second initialization signal line Q132 on the reference surface N. For example, referring to FIG. 32, the orthographic projection of the metal line GL on the reference surface N at least partially overlaps with the orthographic projection of the second initialization signal line Q132 on the reference surface N.

By arranging the orthographic projection of the metal line GL on the reference surface N to at least partially overlap with the orthographic projection of at least one first signal line Q1 on the reference surface N, a position of metal lines GL extending along the first direction X in the touch structure 10 can be limited by the first signal lines Q1 in the light-emitting substrate 20, so as to avoid blocking the light-emitting paths of the sub-pixels P by the metal lines GL extending along the first direction X, and to improve the efficiency of the light-emission of the sub-pixels P, so as to improve the display effect of the touch display structure 100.

Especially in a scenario where the touch display structure 100 is provided with an under-screen optical device, such as an under-screen optical fingerprint sensor, after a finger touches the screen, the reflected light by the finger needs to pass through the touch structure 10 and the light-emitting substrate 20 in turn in order to transmit the fingerprint information to the optical fingerprint sensor located on a side of the light-emitting substrate 20 away from the touch structure 10, and to realize fingerprint detection.

By arranging the orthographic projection of the metal line GL on the reference surface N to at least partially overlap with the orthographic projection of at least one first signal line Q1 on the reference surface N in a region where the under-screen optical device is provided, it is possible to reduce the distribution density of lines (including metal lines GL and first signal lines Q1) extending along the first direction X in the region provided with the under-screen optical device, to avoid blocking the transmission path of the reflected light by the lines extending along the first direction X, and to effectively increase the light transmittance of the region provided with the under-screen optical device, thereby improving the realization effect of the optical device.

In some embodiments, as shown in FIGS. 31 and 32, the light-emitting substrate 20 further includes a plurality of second signal lines Q2 extending along the second direction Y. An orthographic projection of a metal line GL on the reference surface N at least partially overlaps with an orthographic projection of at least one second signal line Q2 on the reference surface N.

For example, the orthographic projection of the metal line GL on the reference surface N overlaps more than 50% with the orthographic projection of the at least one second signal line Q2 on the reference surface N.

In some embodiments, the second signal lines Q2 may be arranged in at least one of the first source-drain conductive layer 207 or the second source-drain conductive layer 210.

For example, referring to FIG. 31, the aforementioned plurality of second signal lines Q2 include power supply signal lines Q21. The power supply signal lines Q21 are arranged in the second source-drain conductive layer 210.

The power supply signal lines Q21 extend along the second direction Y and are configured to provide a power supply signal to the sub-pixels P, thereby achieving the control of the light-emission of the sub-pixels P.

Referring to FIG. 31, the orthographic projection of the metal line GL on the reference surface N at least partially overlaps with an orthographic projection of a power supply signal line Q21 on the reference surface N.

For example, referring to FIG. 32, the aforementioned plurality of second signal lines Q2 include data signal lines Q22. The data signal lines Q22 are arranged in the second source-drain conductive layer 210.

The data signal lines Q22 extend along the second direction Y and are configured to provide data signals to the sub-pixels P, thereby achieving the control of the light-emission of the sub-pixels P.

Referring to FIG. 32, the orthographic projection of the metal line GL on the reference surface N at least partially overlaps with an orthographic projection of a data signal line Q22 on the reference surface N.

By arranging the orthographic projection of the metal line GL on the reference surface N to at least partially overlap with the orthographic projection of at least one second signal line Q2 on the reference surface N, a position of metal lines GL extending along the second direction Y in the touch structure 10 can be limited by the second signal lines Q2 in the light-emitting substrate 20, so as to avoid blocking the light-emitting paths of the sub-pixels P by the metal lines GL extending along the second direction Y, and to improve the efficiency of the light-emission of the sub-pixels P, so as to improve the display effect of the touch display structure 100.

Especially in a scenario where the touch display structure 100 is provided with an under-screen optical device, such as an under-screen optical fingerprint sensor, by arranging the orthographic projection of the metal line GL on the reference surface N to at least partially overlap with the orthographic projection of at least one second signal line Q2 on the reference surface N in a region where the under-screen optical device is provided, it is possible to reduce the distribution density of lines (including metal lines GL and second signal lines Q2) extending along the second direction Y in the region provided with the under-screen optical device, to avoid blocking the transmission path of the reflected light by the lines extending along the second direction Y, and to effectively increase the light transmittance of the region provided with the under-screen optical device, thereby improving the realization effect of the optical device.

In some embodiments, as shown in FIGS. 31 and 32, an orthographic projection of a metal line GL extending along the first direction X on the reference surface N at least partially overlaps with an orthographic projection of at least one first signal line Q1 on the reference surface N, and an orthographic projection of a metal line GL extending along the second direction Y on the reference surface N at least partially overlaps with an orthographic projection of at least one second signal line Q2 on the reference surface N.

By arranging the orthographic projection of the metal line GL extending along the first direction X on the reference surface N to at least partially overlap with the orthographic projection of at least one first signal line Q1 on the reference surface N, and the orthographic projection of the metal line GL extending along the second direction Y on the reference surface N to at least partially overlap with the orthographic projection of at least one second signal line Q2 on the reference surface N, i.e., causing the metal lines GL of the metal grid squares G to overlap with the signal lines (including the first signal lines Q1 and the second signal lines Q2), a position of the metal grid squares G in the touch structure 10 can be limited by the signal lines in the light-emitting substrate 20, so as to avoid blocking the light-emitting paths of the sub-pixels P by the metal grid squares G, and to improve the efficiency of the light-emission of the sub-pixels P, so as to improve the display effect of the touch display structure 100.

Especially in a scenario where the touch display structure 100 is provided with an under-screen optical device, such as an under-screen optical fingerprint sensor, in a region where the under-screen optical device is provided, by arranging the orthographic projection of the metal line GL extending along the first direction X on the reference surface N to at least partially overlap with the orthographic projection of at least one first signal line Q1 on the reference surface N, and the orthographic projection of the metal line GL extending along the second direction Y on the reference surface N to at least partially overlap with the orthographic projection of at least one second signal line Q2 on the reference surface N, it is possible to reduce the distribution density of lines (including metal lines GL, first signal lines Q1 and second signal lines Q2) in the region provided with the under-screen optical device, to avoid blocking the transmission path of the reflected light by the lines, and to effectively increase the light transmittance of the region provided with the under-screen optical device, thereby improving the realization effect of the optical device.

The inventors of the present disclosure have performed an analysis of the touch effect of the touch display structure 100 provided in some embodiments of the present disclosure.

Experimental Group, in which: a metal grid square G in the touch structure 10 provided by the embodiments of the present disclosure corresponds to three sub-pixels P; and in the touch structure 10, a first touch channel 1 includes two adjacent first touch channels 1a, and a second touch channel 2 include two adjacent second sub-touch channels 2a, that is, four first connection structures M1 are provided in a touch unit region J.

Comparative Group, in which: in related art, a metal grid square in the touch structure corresponds to one sub-pixel, and each touch channel includes only one sub-touch channel.

The analysis results are as follows:

TABLE 1

| | Comparative Group | Experimental Group | Change Rate |
|---|---|---|---|
| Initial Mutual Capacitance Value (pF) | 1.08 | 0.91 | −15.74% |
| Touch Mutual Capacitance Value (pF) | 1.01 | 0.80 | −20.79% |
| Change Amount Of Mutual Capacitance (pF) | 0.07 | 0.11 | +57.14% |
| Proportion Of The Change Amount Of Mutual Capacitance | 6.48% | 12.09% | |
| Self-Capacitance Value Of The First Touch Electrode (pF) | 10.90 | 10.21 | −6.33% |
| Self-Capacitance Value Of The Second Touch Electrode (pF) | 13.35 | 11.22 | −15.96% |
| Resistance Of The First Touch Electrode (Ω) | 15.51 | 21.46 | +38.36% |
| Resistance Of The Second Touch Electrode (Ω) | 14.43 | 21.90 | +51.76% |

Here, the "initial mutual capacitance value" is a mutual capacitance value of the touch structure 10 when the finger does not touch the screen; the "touch mutual capacitance value" is a mutual capacitance value of the touch structure 10 when a finger touches the screen to perform touching; the "change amount of mutual capacitance value" is the difference between the initial mutual capacitance value and the touch mutual capacitance value; and the "proportion of the change amount of mutual capacitance value" is a proportion of change amount of mutual capacitance value relative to the initial mutual capacitance value.

The higher the proportion of the mutual capacitance change, the stronger the sensing capability of the touch structure 10 when a finger touches the screen, that is, the higher the touch sensitivity of the touch structure 10 and the better the touch effect.

It can be seen from Table 1 that in the touch display structure 100 provided by the embodiments of the present disclosure, the resistance of the touch structure 10 is only improved to a small extent, and the proportion of the change amount of the mutual capacitance value of the touch structure 10 is nearly doubled relative to the touch structure in the related art, i.e., the touch sensitivity is greatly improved.

In summary, the touch display structure 100 provided by the embodiments of the present disclosure can maintain the resistance of the touch structure 10 within a level at which a normal touch effect can be realized while increasing the light transmittance of the touch structure 10 (i.e., one metal grid square G corresponds to at least two sub-pixels P), while taking into account both the display effect and the touch effect.

The foregoing description is only specific embodiments of the present disclosure, but the scope of protection of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

The invention claimed is:

1. A touch display structure, comprising a light-emitting substrate and a touch structure provided on at least one side of the light-emitting substrate, wherein the touch structure includes a plurality of first touch channels extending along a first direction, and a plurality of second touch channels extending along a second direction, and the first direction and the second direction cross each other; and the plurality of first touch channels and the plurality of second touch channels are insulated from each other, wherein at least one first touch channel includes multiple adjacent first sub-touch channels, and a first sub-touch channel includes multiple first touch electrodes arranged along the first direction and electrically connected in sequence; and in a same first touch channel, two adjacent first sub-touch channels are electrically connected; and/or at least one second touch channel includes multiple adjacent second sub-touch channels, and a second sub-touch channel includes multiple second touch electrodes arranged along the second direction and electrically connected in sequence; and in a same second touch channel, two adjacent second sub-touch channels are electrically connected;

the touch structure includes a plurality of metal lines, the plurality of metal lines cross each other to form a plurality of metal grid squares, and the plurality of metal grid squares form first touch electrodes and second touch electrodes in the touch structure; and the light-emitting substrate includes a plurality of sub-pixels, and each sub-pixel includes a light-emitting region; and orthographic projections of light-emitting regions of at least two sub-pixels on a reference surface are located within a range of an orthographic projection of a same metal grid square on the reference surface, and the reference surface is a plane where the light-emitting substrate is located;

wherein the light-emitting substrate includes a plurality of pixel units, and each pixel unit includes multiple sub-pixels capable of emitting light of different colors; and orthographic projections of light-emitting regions of the multiple sub-pixels of the pixel unit on the reference surface are located within a range of an orthographic projection of at least one metal grid square on the reference surface; and of the multiple sub-pixels of the pixel unit, orthographic projections of light-emitting regions of at least two sub-pixels on the reference surface are located within the range of the orthographic projection of the same metal grid square on the reference surface.

2. The touch display structure according to claim 1, wherein along the second direction, for the two adjacent first sub-touch channels in the same first touch channel, first touch electrodes in one first sub-touch channel are provided in one-to-one correspondence with first touch electrodes in the other first sub-touch channel; and at least one pair of correspondingly arranged first touch electrodes are electrically connected.

3. The touch display structure according to claim 2, wherein the first touch channel further includes at least one first connection portion, the at least one pair of correspondingly arranged first touch electrodes are electrically connected through a first connection portion, and the first connection portion as a whole extends along the second direction.

4. The touch display structure according to claim 1, wherein along the first direction, for the two adjacent second sub-touch channels in the same second touch channel, second touch electrodes in one second sub-touch channel are provided in one-to-one correspondence with second touch electrodes in the other second sub-touch channel; and at least one pair of correspondingly arranged second touch electrodes are electrically connected.

5. The touch display structure according to claim 4, wherein the second touch channel further includes at least one second connection portion, the at least one pair of correspondingly arranged second touch electrodes are electrically connected through a second connection portion, and the second connection portion as a whole extends along the first direction.

6. The touch display structure according to claim 1, wherein
along the second direction, for the two adjacent first sub-touch channels in the same first touch channel, first touch electrodes in one first sub-touch channel are provided in one-to-one correspondence with first touch electrodes in the other first sub-touch channel; and at least one pair of correspondingly arranged first touch electrodes are electrically connected;
along the first direction, for the two adjacent second sub-touch channels in the same second touch channel, second touch electrodes in one second sub-touch channel are provided in one-to-one correspondence with second touch electrodes in the other second sub-touch channel; and at least one pair of correspondingly arranged second touch electrodes are electrically connected;
the first touch channel further includes multiple first connection portions, the at least one pair of correspondingly arranged first touch electrodes are electrically connected through a first connection portion, and the first connection portion as a whole extends along the second direction; and
the second touch channel further includes multiple second connection portions, the at least one pair of correspondingly arranged second touch electrodes are electrically connected through a second connection portion, and the second connection portion as a whole extends along the first direction;
wherein at least one first connection portion crosses at least one second connection portion.

7. The touch display structure according to claim 6, wherein the touch display structure comprises a first conductive layer, an insulating layer and a second conductive layer that are stacked; and the insulating layer is located between the first conductive layer and the second conductive layer, and is provided therein with via holes; and
the first touch electrodes and the second touch electrodes are located in the first conductive layer, wherein
the first connection portions are located in the first conductive layer, the second connection portions are located in the second conductive layer, and a second connection portion is electrically connected to corresponding second touch electrodes through via holes; or
the second connection portions are located in the first conductive layer, the first connection portions are located in the second conductive layer, and a first connection portion is electrically connected to corresponding first touch electrodes through via holes.

8. The touch display structure according to claim 1, wherein the first touch channel further includes third connection portions; and along the first direction, any two adjacent first touch electrodes are electrically connected through a third connection portion; and
the second touch channel further includes fourth connection portions; and along the second direction, any two adjacent second touch electrodes are electrically connected through a fourth connection portion.

9. The display substrate according to claim 8, wherein the first touch electrodes and the second touch electrodes are all substantially rhombus-shaped electrodes;
the first touch channel is located in a first rectangular region extending along the first direction, the second touch channel is located in a second rectangular region extending along the second direction, and a rectangular region in which the first rectangular region and the second rectangular region cross each other is a touch unit region;
the third connection portion and the fourth connection portion cross each other to form a first connection structure; and
the touch unit region is provided therein with at least two first connection structures.

10. The touch display structure according to claim 9, wherein the first touch channel includes first connection portions, and the second touch channel includes second connection portions; and a first connection portion and a second connection portion cross each other to form a second connection structure, and the touch unit region is further provided therein with at least one second connection structure; and/or
at least one of the first touch electrodes is located in the touch unit region, and/or at least one of the second touch electrodes is located in the touch unit region.

11. The touch display structure according to claim 9, wherein in the touch unit region, there are two first touch electrodes located in a same first sub-touch channel and provided adjacent to each other, and two second touch electrodes located in a same second sub-touch channel and provided adjacent to each other, wherein of the two first touch electrodes, each first touch electrode is provided adjacent to both the two second touch electrodes.

12. The touch display structure according to claim 8, wherein the first touch electrodes, the second touch electrodes, the third connection portions and the fourth connection portions each are formed by multiple metal grid squares; and
the first touch channel includes a first connection portion, and/or the second touch channel includes a second connection portion, the first connection portion and/or the second connection portion is formed by another multiple metal grid squares.

13. The touch display structure according to claim 1, wherein the pixel unit includes one sub-pixel capable of emitting red light, one sub-pixel capable of emitting blue light and two sub-pixels capable of emitting green light, wherein
the orthographic projections of the light-emitting regions of all sub-pixels of the pixel unit on the reference surface are located within the range of the orthographic projection of the same metal grid square on the reference surface.

14. The touch display structure according to claim 13, wherein the multiple sub-pixels adopt a GGRB arrangement.

15. The touch display structure according to claim 1, wherein the pixel unit includes one sub-pixel capable of emitting red light, one sub-pixel capable of emitting blue light and one sub-pixel capable of emitting green light, wherein
the orthographic projections of the light-emitting regions of all sub-pixels of the pixel unit on the reference surface are located within the range of the orthographic projection of the same metal grid square on the reference surface; or
in the pixel unit, an orthographic projection of a light-emitting region of the sub-pixel capable of emitting blue light and an orthographic projection of a light-emitting region of the sub-pixel capable of emitting green light on the reference surface are both located within the range of the orthographic projection of the same metal grid square on the reference surface, and an orthographic projection of a light-emitting region of the sub-pixel capable of emitting red light on the reference surface is located within a range of an orthographic projection of another metal grid square on the reference surface.

16. The touch display structure according to claim 15, wherein the multiple sub-pixels adopt a Real RGB arrangement.

17. The touch display structure according to claim 1, wherein the plurality of metal grid squares include a plurality of first sub-grid square groups and a plurality of second sub-grid square groups, the first sub-grid square groups and the second sub-grid square groups are alternately arranged; and a first sub-grid square group includes at least one first sub-grid square, and a second sub-grid square includes at least one second sub-grid square; and
the light-emitting substrate includes a plurality of pixel units, and each pixel unit includes multiple sub-pixels capable of emitting light of different colors; orthographic projections of light-emitting region of some of multiple sub-pixels of a pixel unit on the reference surface are located within a range of an orthographic projection of a same first sub-grid square on the reference surface; and orthographic projections of light-emitting regions of all sub-pixels of another pixel unit on the reference surface are located within a range of an orthographic projection of a same second sub-grid square on the reference surface.

18. The touch display structure according to claim 1, wherein the plurality of metal lines extend in a straight line, and the plurality of metal grid squares formed by the plurality of metal lines crossing each other each are in a shape of a rectangle; or the plurality of metal lines extend in a folded line, and the plurality of metal grid squares formed by the plurality of metal lines crossing each other each are in a shape of a polygon; or a portion of the plurality of metal lines extends in a straight line, another portion of the plurality of metal lines extends in a folded line, and the plurality of metal grid squares formed by the plurality of metal lines crossing each other are in shapes of rectangles and polygons; and/or
light-emitting regions of at least one pair of adjacent sub-pixels are correspondingly provided therebetween with multiple metal lines, and the multiple metal lines are electrically connected to each other; and/or
the light-emitting substrate further includes a plurality of first signal lines extending along the first direction, and an orthographic projection of a metal line on the reference surface at least partially overlaps with an orthographic projection of at least one first signal line on the reference surface; and/or
the light-emitting substrate further includes a plurality of second signal lines extending along the second direction, and an orthographic projection of a metal line on the reference surface at least partially overlaps with an orthographic projection of at least one second signal line on the reference surface.

19. A display apparatus, comprising the touch display structure according to claim 1.

20. A touch display structure, comprising a light-emitting substrate and a touch structure provided on at least one side of the light-emitting substrate, wherein
the touch structure includes a plurality of first touch channels extending along a first direction, and a plurality of second touch channels extending along a second direction, and the first direction and the second direction cross each other; and the plurality of first touch channels and the plurality of second touch channels are insulated from each other, wherein
at least one first touch channel includes multiple adjacent first sub-touch channels, and a first sub-touch channel includes multiple first touch electrodes arranged along the first direction and electrically connected in sequence; and in a same first touch channel, two adjacent first sub-touch channels are electrically connected; and/or
at least one second touch channel includes multiple adjacent second sub-touch channels, and a second sub-touch channel includes multiple second touch electrodes arranged along the second direction and electrically connected in sequence; and in a same second touch channel, two adjacent second sub-touch channels are electrically connected;
the touch structure includes a plurality of metal lines, the plurality of metal lines cross each other to form a plurality of metal grid squares, and the plurality of metal grid squares form first touch electrodes and second touch electrodes in the touch structure; and the light-emitting substrate includes a plurality of sub-pixels, and each sub-pixel includes a light-emitting region; and orthographic projections of light-emitting regions of at least two sub-pixels on a reference surface are located within a range of an orthographic projection of a same metal grid square on the reference surface, and the reference surface is a plane where the light-emitting substrate is located;

wherein the plurality of metal grid squares include a plurality of first sub-grid square groups and a plurality of second sub-grid square groups, the first sub-grid square groups and the second sub-grid square groups are alternately arranged; and a first sub-grid square group includes at least one first sub-grid square, and a second sub-grid square includes at least one second sub-grid square; and the light-emitting substrate includes a plurality of pixel units, and each pixel unit includes multiple sub-pixels capable of emitting light of different colors; orthographic projections of light-emitting region of some of multiple sub-pixels of a pixel unit on the reference surface are located within a range of an orthographic projection of a same first sub-grid square on the reference surface; and orthographic projections of light-emitting regions of all sub-pixels of another pixel unit on the reference surface are located within a range of an orthographic projection of a same second sub-grid square on the reference surface.

* * * * *